May 13, 1941. R. C. RUSSELL Re. 21,802
VALVE OPERATING MECHANISM
Original Filed Aug. 19, 1932 6 Sheets-Sheet 1
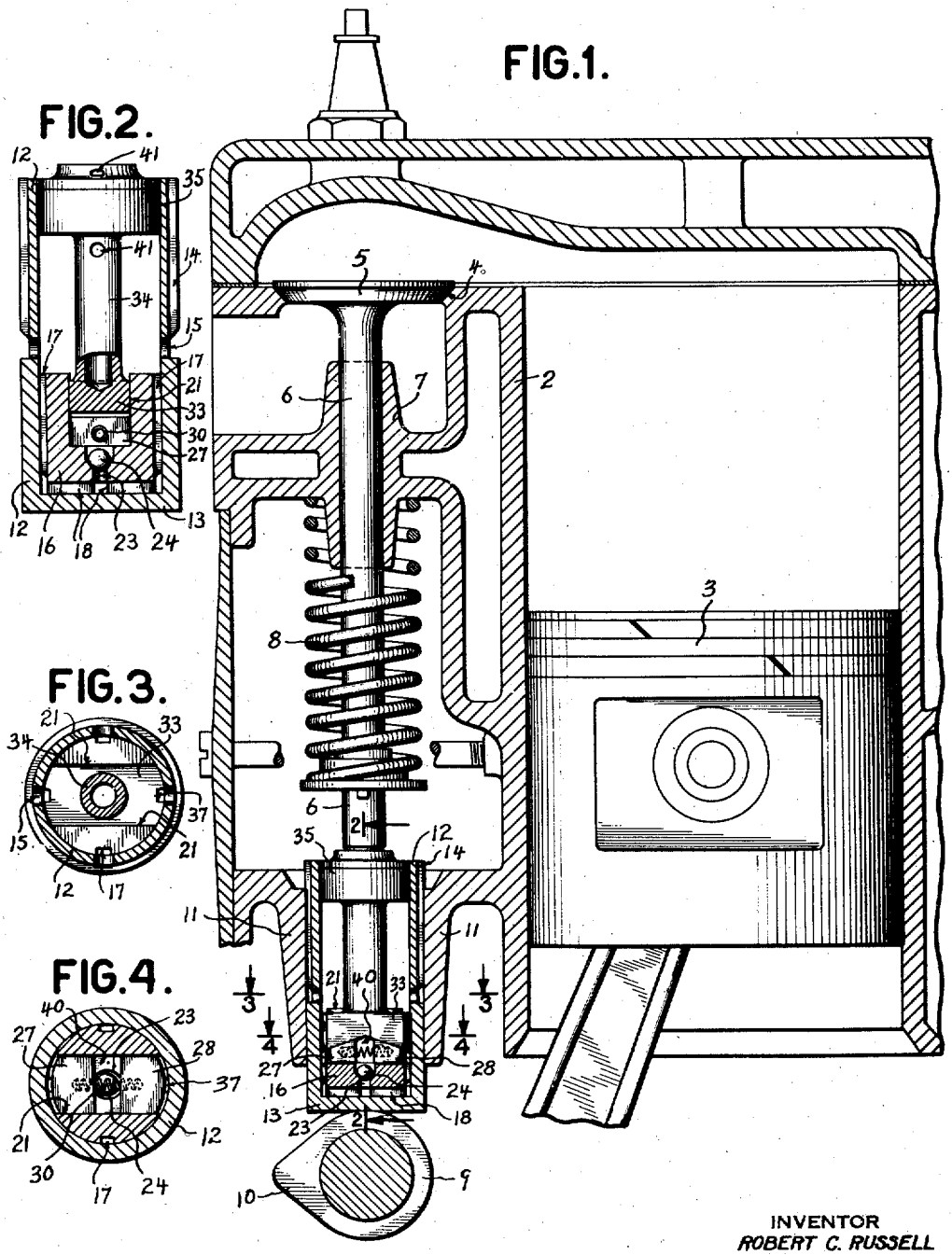
INVENTOR
ROBERT C. RUSSELL
BY Bohleber & Godbetter
ATTORNEYS May 13, 1941. R. C. RUSSELL Re. 21,802

VALVE OPERATING MECHANISM

Original Filed Aug. 19, 1932 6 Sheets-Sheet 2

INVENTOR
ROBERT C. RUSSELL

BY Pohleber & Pedbetter
ATTORNEYS

May 13, 1941. R. C. RUSSELL Re. 21,802

VALVE OPERATING MECHANISM

Original Filed Aug. 19, 1932 6 Sheets-Sheet 3

INVENTOR
ROBERT C. RUSSELL
BY Bohleber & Ledbetter
ATTORNEYS

May 13, 1941. R. C. RUSSELL Re. 21,802
VALVE OPERATING MECHANISM
Original Filed Aug. 19, 1932 6 Sheets-Sheet 4
FIG.14.
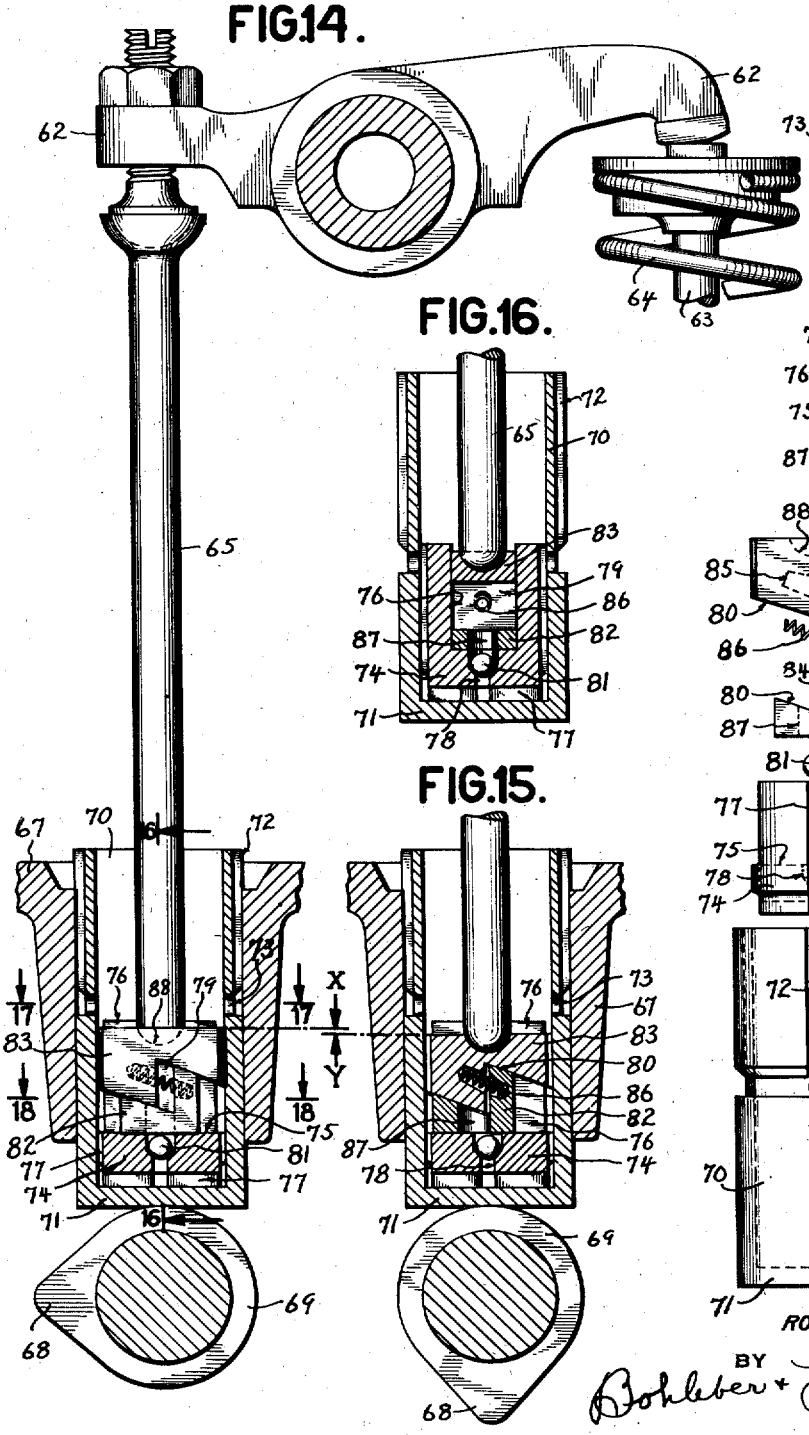
FIG.17.
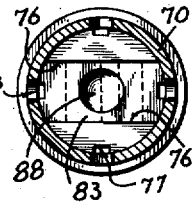
FIG.18.
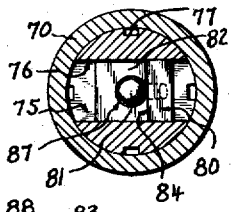
FIG.16.
FIG.15.
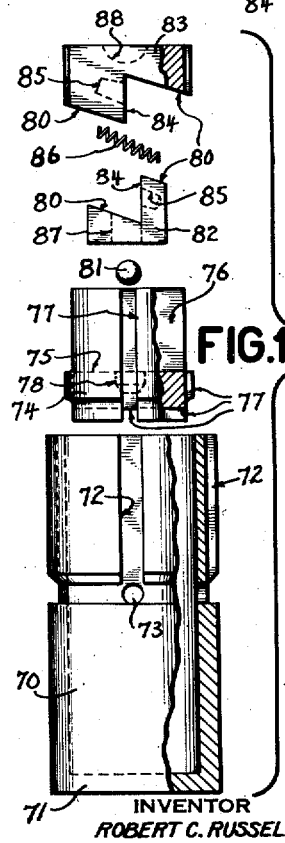
FIG.13.
INVENTOR
ROBERT C. RUSSELL
BY Bohleber + Fedbetter
ATTORNEYS May 13, 1941. R. C. RUSSELL Re. 21,802

VALVE OPERATING MECHANISM

Original Filed Aug. 19, 1932 6 Sheets-Sheet 5

INVENTOR
ROBERT C. RUSSELL

BY Bohleber + Fredbetter
ATTORNEYS

May 13, 1941. R. C. RUSSELL Re. 21,802

VALVE OPERATING MECHANISM

Original Filed Aug. 19, 1932 6 Sheets-Sheet 6

INVENTOR
ROBERT C. RUSSELL

BY Bohleber + Ledbetter
ATTORNEYS

Reissued May 13, 1941

Re. 21,802

UNITED STATES PATENT OFFICE 21,802

VALVE OPERATING MECHANISM

Robert C. Russell, Cleveland, Ohio, assignor to Eaton Manufacturing Company, Cleveland, Ohio, a corporation of Ohio Original No. 2,158,730, dated May 16, 1939, Serial No. 629,474, August 19, 1932. Application for reissue November 29, 1940, Serial No. 367,864

51 Claims. (Cl. 123—90)

This invention relates to valve operating mechanism and more particularly to automatic or self-adjusting and hence silent valve lifters or valve tappets for use primarily in connection with internal combustion motors to maintain a no-clearance operating engagement between all parts of said mechanism.

It is a well known fact that the exact time of closing and opening the valves, in relation to the position of the piston in an engine cylinder, are important factors which affect the performance of the engine or motor. A quick opening and quick closing valve increases engine horse power but has two definite disadvantages, namely, noisy operation and short life for the valve operating mechanism. On the other hand, a slow or gradual opening and closing valve has the two advantages of being quiet in operation and of longer life but does not afford high motor efficiency. Even with the slow opening and closing valve, having the advantages just named, great destructive forces are set up at high speed due to the necessary operating clearance between the cam and valve mechanism now in general use, and this destructive tendency increases with the speed of the engine.

Another disadvantage of conventional valve mechanisms arises from variations in the length of the valve stem or push rod and other operating parts, thus varying the operating clearance which is caused by changes in temperature, thereby resulting in the constantly changing time of valve opening and closing actions, and consequently lowering the motor efficiency. A compensating, i. e., self-adjusting, valve mechanism which will constantly maintain its operating clearance at zero or at a no-clearance relation, despite variations in temperature and wear of parts, renders practical the use of quick opening and closing valve operating mechanism, prolongs its life even at high speed, and affords accurately uniform and unvarying valve timing.

It is, therefore, a general purpose of this invention, to produce novel self-adjusting or compensating valve tappets or lifters for operating the spring loaded valves, usually poppet-type valves, in relation to their seats, as used generally in machinery, engines and the like, and to automatically maintain a no-clearance operating engagement or relationship between all parts of the mechanism intermediate the engine or machine driven cam and the valve seat in the cylinder. The invention promotes operating efficiency, improves valve timing, avoids impact of parts, avoids wear and destructive hammering of the valve seats, and eliminates noise and vibration. The necessity for a solution of these problems is especially pronounced in high speed internal combustion motors. In aviation engines, the solution of the problem by eliminating the unusually great valve operating clearance, is highly desirable to increase engine power, avoid valve trouble, and promote safety.

The invention, therefore, seeks to produce several practical commercial forms of silent, automatic, self-adjusting valve lifters or tappets and which are not subjected to wear in the performance of their automatic compensating or self-adjusting function, and which can be produced sufficiently economically to justify their general use.

In keeping with these purposes, it is my object to produce novel valve lifters capable of inherently automatic self-adjustment or a take-up function in the length of all parts of the mechanism for compensation in both directions, i. e., for both contraction and expansion of the valve stem and associated members, occasioned by temperature variation, as well as for wear at the bearing or engaging and contacting surfaces of all operating parts.

A further object is to produce silent and self-adjusting valve tappets of a solely novel hydraulic type and which combine both hydraulic and mechanical features by employing a novel hydro-mechanical principle of dual aspect and which functions in conjunction with a small volume of oil under light pressure and confined in a variable size liquid or hydraulic compensating chamber which increases or decreases in volume to effect the self-adjusting function and thus maintains the valve operating mechanism in a self-adjusted zero-clearance state.

In an hydraulic valve lifter it is important that the inflow of liquid such as oil into the compensating chamber should respond quickly to the slightest compensating movement of the self-adjusting elements, but where it is sought to use a spring to seat the tappet control valve, the inflow of oil is retarded and thus sensitivity is lost, inasmuch as the spring must first be compressed. I find that the control valve for the small volume hydraulic lifting chamber should be entirely free of spring means and only urged to its seat by gravity, or by the up stroke of the tappet to open the engine valve, or by the pressure in the hydraulic chamber, and certainly not by a spring. It is an object of this invention to produce a valve lifter meeting these conditions by which to attain quick priming of the hydraulic chamber and instantly added increments of oil to compensate for the slightest contracting of any operating parts.

It is also found that a free circulation of oil should be provided in a hydraulic tappet, since to compress the same body of oil an infinite number of times causes the oil to become aerated and emulsified into a deteriorated thin jelly-like mass and when in this state it is no longer non-compressible and loses its capacity to actuate the engine valve against its stiff closing spring. Serious defects with hydraulic tappets have been caused by air soaked oil which is a condition found difficult to overcome because at high engine speed the tappet reciprocates very rapidly which violently churns and emulsifies the oil, more especially so when the oil is under great pressure as indeed it is when lifting the valve against its closing spring unless a great portion of the load or pressure of that spring is eliminated. The supply of oil available for the compensating hydraulic chamber should be fed and bled so that the supply is of fresh oil at all times, otherwise the rapid reciprocation of the tappet will churn and render said oil supply useless as a non-compressible body and would fail as such if drawn into the compensating chamber and would not transmit the throw of the cam to open the engine valve. Each valve-opening movement of the tappet should tend to force new oil to the supply receptacle adjacent to and available for feeding the smaller hydraulic compensating lifting chamber and the old oil should pass out through an overflow back to the engine crank case. These desirable features, I now attain by a simple construction of few parts and without special oil pipe leads and without pressure supply lines or complicated tubing or piping.

A further object of the invention is to produce a valve lifter wherein the hydraulic compensating means or self-adjusting unit per se actuates through a greater distance than the corresponding variation or change in length of the valve operating parts, and this results in providing a low compression hydraulic chamber with minimum tendency to force out or lose its oil when opening the engine valve. In other words, the compensators per se in my invention have a proportionately greater travel (say several thousandths of an inch) in maintaining the zero-clearance function, than the movement or change in length (say only one thousandth of an inch) of the valve stem or push rod and other parts constituting the engine valve operating mechanism. This characteristic function of my invention produces a quick opening of the compensating oil chamber control valve for the slightest variation in length of the valve mechanism and draws a comparatively large volume of fresh oil into said chamber for a relatively small variation in length of operating parts. Thus by amplifying or greatly increasing the compensating movement of the self-adjusting means, relatively to the shorter change in length of the valve stem and other parts, a rapidly filling and self-priming tappet is produced. Thus, while in operation, if the oil supply should fail or run low, or if for some cause the hydraulic chamber should drain due to long non-use of the engine, the valve lifter will function as a conventional tappet without serious harm, and when the engine is started or the oil supply is again available the tappet will immediately pick up oil by sucking it in and resume its function as a compensating device. This feature is also a great advantage in assembling the tappets in an engine. The tappet or lifter sleeve with its self-adjusting unit may be put in place perfectly dry and without adjustment. When the motor is started and oil reaches my valve lifters, they will instantly prime themselves and properly start functioning and automatically assume a state of zero-clearance adjustment and no further attention is required.

A further object is to produce a dual or combination hydraulic-mechanical valve lifter or tappet including a novel combination of spring means and compensating parts which exert very little force against the heel of the valve operating cam, whereby my novel device avoids undue friction and wear against said cam during the period the valve is on its seat. Therefore, the cam followers of my tappets have a period of rest and wear is minimized due to the reduced bearing friction on the heel of the cam.

Another object is to produce a valve lifter having novel overlying self-adjusting wedge means confined within a guide chamber and defining therein the compensating hydraulic lift chamber of relatively small internal volume, the greater portion of the load or expansive force and pressure, as exerted by the spring loaded engine valve, being carried mechanically and positively through the metallic wedge means, whereas only a small portion of said load or pressure in opening the engine valve is transmitted through the hydro-compensating chamber. I employ the hydraulic chamber as an element in the valve lifting means but it lifts only a small per cent of the valve load. In this way is attained a characteristic and noteworthy reduction of pressure on the oil in the hydraulic compensating chamber to minimize the tendency of the oil to emulsify therein and also avoid loss of oil from the chamber when lifting the engine valve off its seat. In this connection, I really employ the hydraulic chamber, the oil therein, to lock or hold apart the wedges in their precisely self-adjusted position, whereas the thrust or great load of the cam and engine valve spring is carried directly through the coacting wedge faces which are restrained from slipping or displacement by the sealed incompressible oil body between the wedges.

Another object is to produce hydraulic valve lifter compensating instrumentalities including means acting to positively expel the air, or a maximum portion thereof, from the hydraulic compression chamber, prior to the oil filling operation, and thus avoid entrapping air or occluded gas bubbles, and by which is secured a positive and solid oil or liquid body thru which to transmit the force, or a part thereof, from the rotating cam to the reciprocating valve, to open or actuate the latter against the compression of its closing spring.

Pursuant to the foregoing air-expelling function, it is a further object of this invention to produce a hydraulic valve operating device having maximum displacement means by which the volume of the hydraulic compression chamber is reduced to zero or to a minimum space, i. e., minute in volumetric capacity (or the chamber entirely closes or disappears for complete displacement), upon the first turn of the engine cam, preliminary to sucking a charge of oil into the maximum displacement oil chamber, and in this way the air is initially expelled from the hydraulic compression chamber and thus said chamber is conditioned to receive and retain a solid body of air-free oil. In this way is minimized the likelihood of the oil becoming air bound or locked, aerated and emulsified, and hence I prevent the hydraulic oil body from losing its incompressible characteristics.

The foregoing object, i. e. the attainment of maximum displacement for the hydraulic chamber, can of course be carried out with either a large or small volume hydraulic chamber. I have, however, illustrated my invention with a reduced size or minimum volume compression chamber of my maximum-displacement type, the object being to operate the self-adjusting unit in the device on a comparatively small oil body and thus make use of a minimum of aerated oil in any event should there be a tendency toward the presence of air.

A still further object is to produce a hydraulic tappet having a comparatively small volume compression chamber in combination with a substantially large size non-draining oil receptacle or supply, the inlet or feed leading into the latter being located high above the bottom wall of said non-drainable receptacle, and the outlet leading from said non-drain receptacle into the small hydraulic chamber being located near the bottom wall of said receptacle.

Also it is an object to produce a hydraulic valve lifter having positive stop means within its self-adjusting unit so as to limit the range of compensation, whereby the device cannot overcompensate, i. e., will not contract or expand beyond certain limits.

Likewise it is a purpose to produce several forms of self-adjusting valve lifters, and to this end there is illustrated a number of examples of construction coming within the scope of my invention to fully show the principles thereof, as set forth in the accompanying drawings, showing automatic compensating means embodying hydro-mechanical features, as follows:

The first form of the invention is illustrated in Figures 1 thru 8 and which I have sometimes referred to as the fork and wedge type of hydraulic valve lifter.

Figure 1 shows a longitudinal section thru a fragmentary portion of a typical internal combustion engine having poppet type valves and in conjunction with which I have illustrated my invention;

Figure 2 shows a longitudinal section thru the valve lifter or tappet as taken on the line 2—2 of Figure 1, on an enlarged scale, and removed from its guide in the engine base;

Figure 3 is a cross-section on the line 3—3 of Figure 1, with the tappet also removed from its guide in the engine base;

Figure 4 is a cross-section on the line 4—4 of Figure 1, but with the upper one piece double face or fork type compensating wedge member removed from the tappet sleeve;

Figure 7:
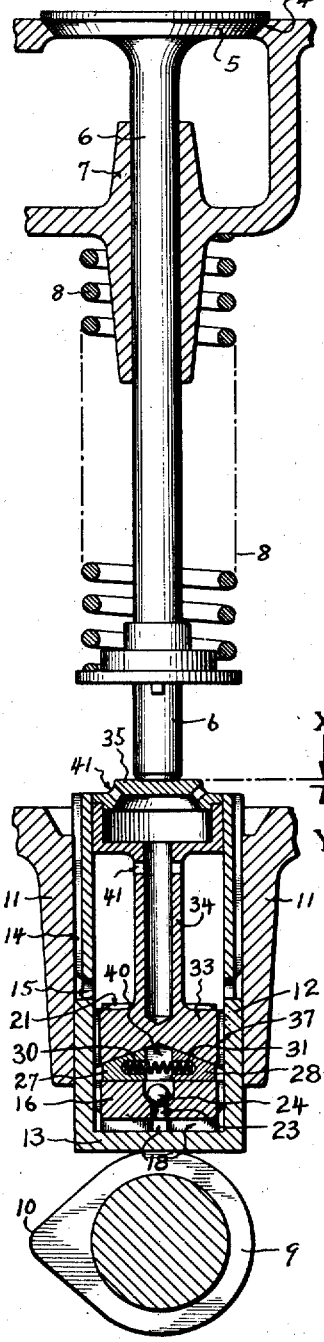
Figure 8:
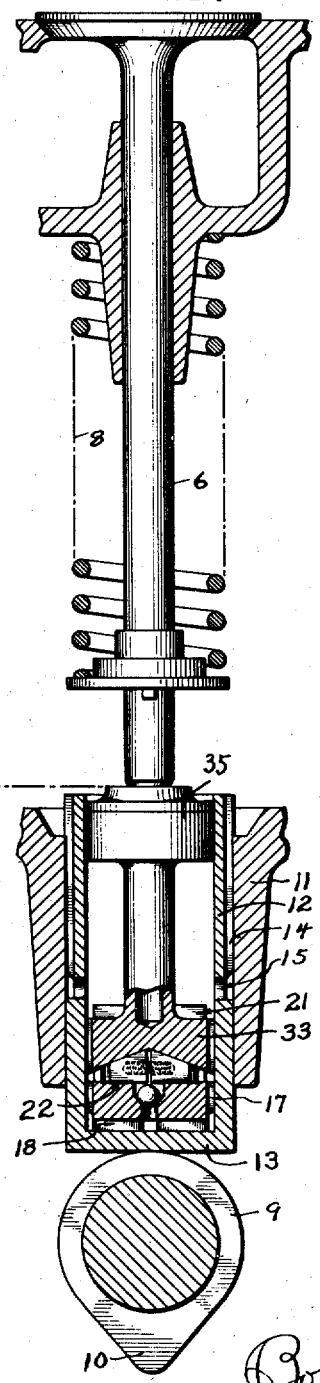
Figure 6:
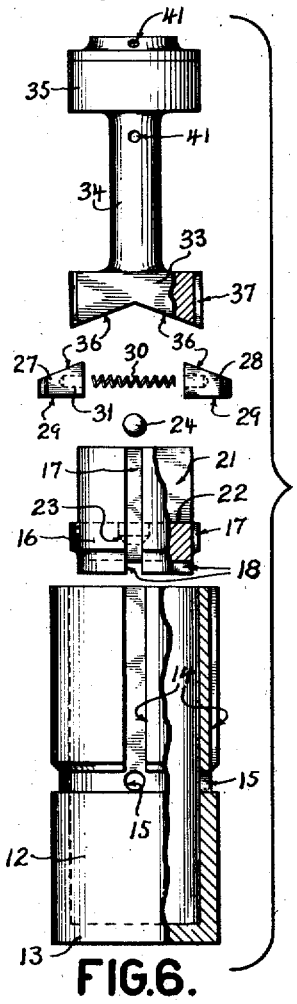

Figure 6 is a cluster or exploded view of the tappet parts removed from the lifter sleeve and disposed in aligned order of assembly, showing the parts, reading from the bottom up, to-wit, the cam follower tappet sleeve, the wedge seat, a ball valve, a compensating spring, the self-adjusting wedge pair, and the overlying double faced wedge fork having its lifting stem and guide head which slidably fits in the upper end of the tappet sleeve to enclose the parts named;

Figure 7 is an assembly view of the valve operating mechanism with the hydraulic valve lifter interposed between the spring loaded valve stem and the engine cam, and this view shows the tappet expanded to compensate for a contracted valve stem, as indicated by the reference line X;

Figure 8 is a view similar to Figure 7 except that the self-adjusting parts have automatically contracted into the tappet sleeve to accommodate a somewhat elongated valve stem, as shown by the reference line Y. The range of several thousandths of an inch variation in length of operating parts is thus diagrammatically shown at XY;

A second form of the invention is shown in Figures 9 thru 12 which illustrate important features in a form of valve lifter construction similar to the first with the exception that this second form shows an enlarged non-draining underneath oil supply chamber or receptacle below the hydraulic compensating chamber and which always positively insures a full flow of fresh oil to the hydraulic chamber formed by the self-adjusting wedges even though the engine has stood idle for a long period and the oil drained away from many of the engine and valve parts. This form of the invention also provides means for oiling the cam from the overflow of oil issuing from the non-draining tappet supply receptacle as an incident to keeping the oil freshly changed in the supply receptacle beneath the compensating chamber.

Figure 11:
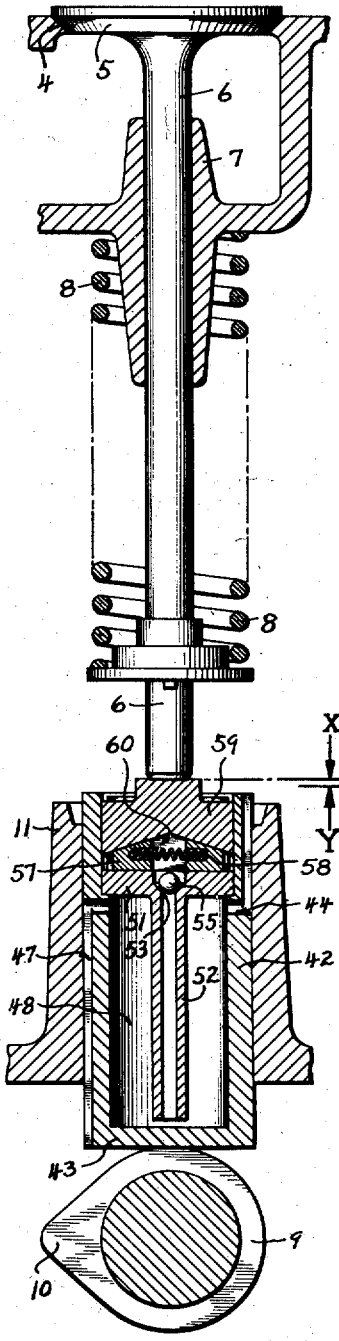
Figure 12:
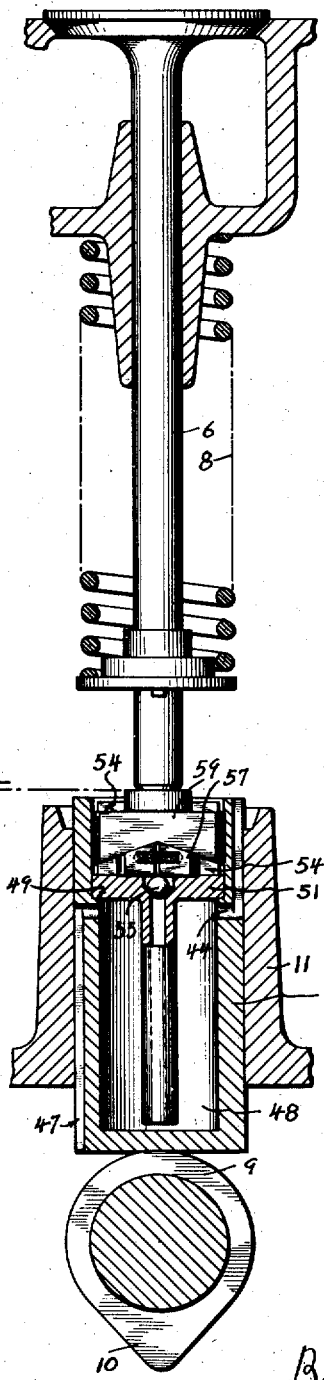
Figure 9:
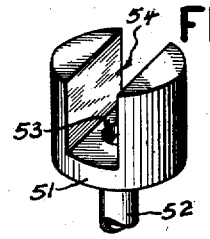
Figure 10:
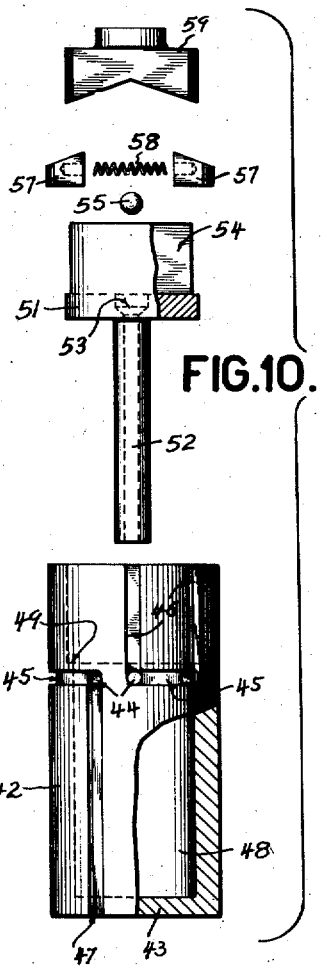

Figure 9 shows a perspective view of a compensating wedge means retained guide or wedge seat having an oil intake neck to project down into the non-draining fresh oil supply chamber and adapted to convey oil to the compensating hydraulic chamber formed in said guide by the wedge means, but with the latter removed;

Figure 10 shows a cluster view of this second form of valve lifter compensating mechanism spread apart in order of assembly;

Figures 11 and 12 are comparative assembly views of an engine cam and spring loaded valve with the hydraulic lifter interposed therebetween, Figure 11 showing the lifter automatically expanded and Figure 12 contracted to maintain a no-clearance engagement in respect to all parts of a conventional valve operating mechanism. The reference lines X and Y show the range of automatic compensation in these two views.

A third form of the invention is shown in Figures 13 through 18 which illustrate a hydraulic valve lifter embodying a modified form of compensating wedge means of reduced number of parts comprising an upper and lower wedge means each of which has a double acting face.

Figure 13 is a cluster view of the third form showing the compensating mechanism removed from the lifter sleeve;

Figure 14 is an assembly view showing how this or any other form of the hydraulic valve lifter may be used in connection with a rocker arm employed in some types of engines for actuating the poppet valves thereof, and Figure 15 is a similar view except that the self-adjusting mechanism is contracted to compensate for elongation of the valve operating mechanism. The reference XY shows the variation in length of the push rod and valve stem;

Figure 16 shows a longitudinal section along the line 16—16 of Figure 14 to more fully show the compensating wedge means within its seat or retainer guide;

Figure 17 is a cross-section on the line 17—17 of Figure 14 with a push rod omitted and the lifter sleeve removed from its guide in the engine base;

Figure 18 is a cross-section on the line 18—18 of Figure 14 with the upper compensating wedge and push rod removed and looking down on a freely movable ball valve which controls the inlet to the hydraulic self-adjusting chamber.

A fourth example of the invention is shown in Figures 19 through 23 and might be referred to as the screw jaw type of self-adjusting hydraulic valve tappet.

Figure 20:
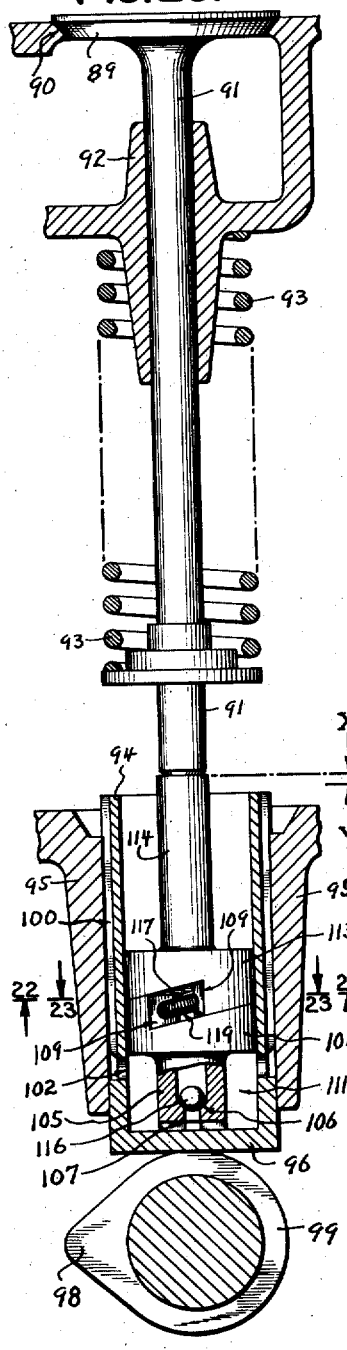
Figure 23:
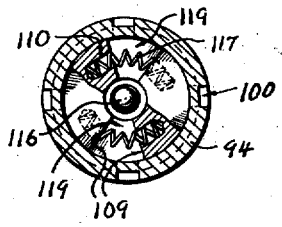
Figure 22:
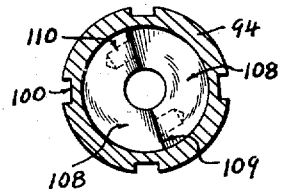
Figure 21:
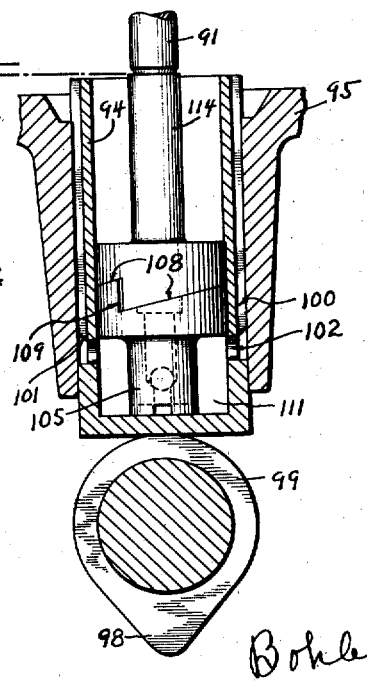
Figure 19:
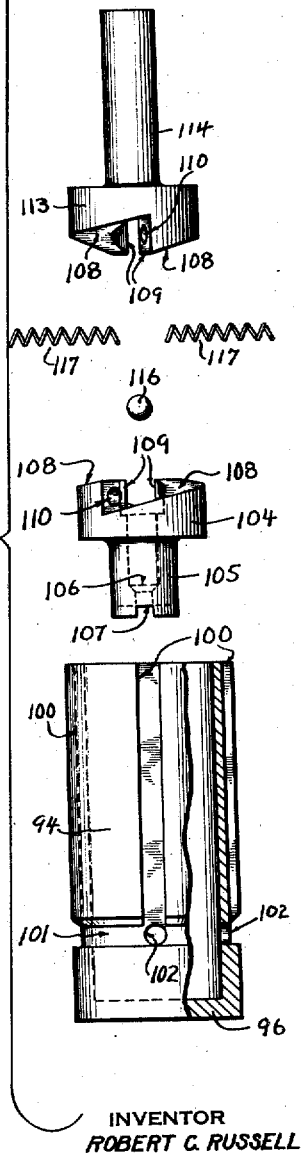

Figure 19 is a cluster view with the compensating parts withdrawn from the tappet sleeve and spaced apart in their order of assembly;

Figures 20 and 21 are valve and cam assembly comparative views showing expanded and contracted positions of the valve lifter to accommodate a contracted valve stem as in Figure 20 and an elongated valve stem as in Figure 21. The spaced reference lines X and Y point out this relationship and shows how the automatic device maintains its no-clearance engagement between the cam and valve stem throughout the XY range of variation in length of parts;

Figure 22 is a cross-section on the line 22—22 of Figure 20 but with the upper self-adjusting screw jaw or wedge means removed from the tappet sleeve to expose the wedge faces of the lower stationary member;

Figure 23 is a cross-section on the line 23—23 of Figure 20 illustrating the two spring means tending to expand the valve lifter by rotating the two screw jaw compensators.

A fifth example of construction is illustrated in Figures 24 through 28 and which also comprises a hydro-controlled triple mechanical wedge means designed to compensate for all variations in length of the valve operating mechanism, and wherein the hydraulic chamber is remote from the wedge means.

Figure 25:
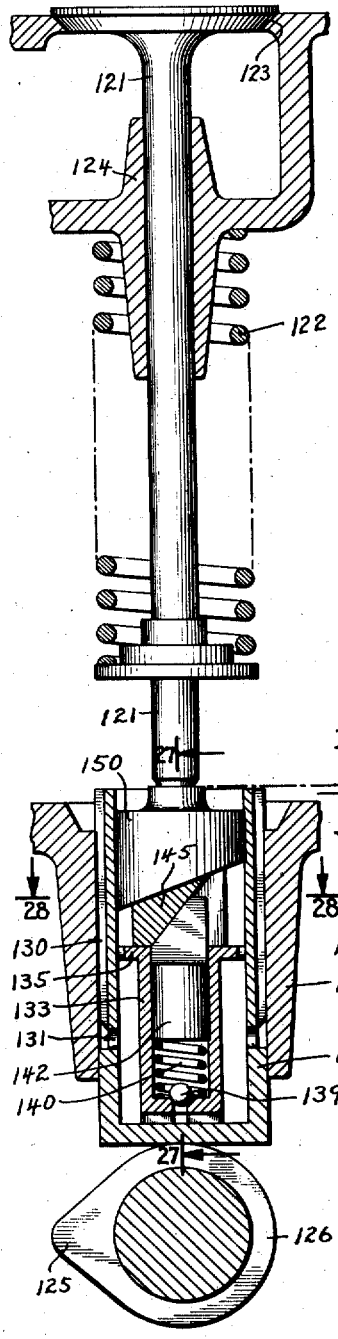
Figure 28:
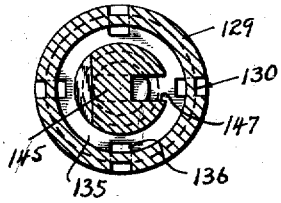
Figure 27:
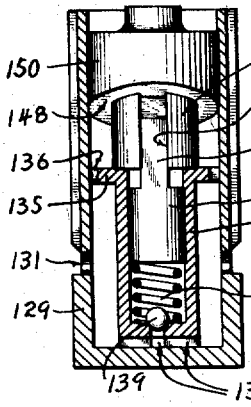
Figure 26:
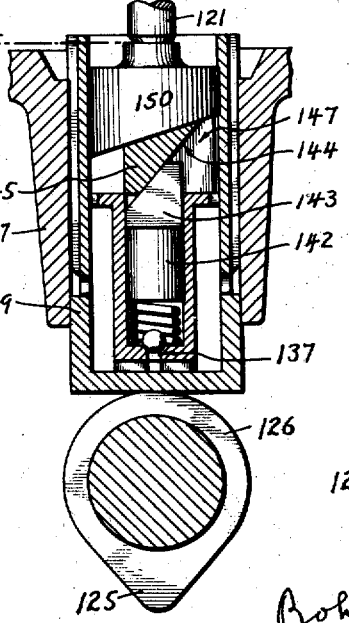
Figure 24:
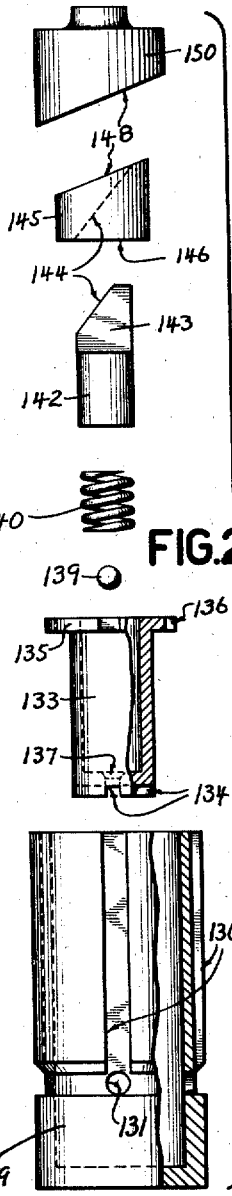

Figure 24 shows the compensating parts in spaced alignment in the order of their assembly and withdrawn from the tappet sleeve;

Figures 25 and 26 illustrate comparative position and assembly views with the hydraulic valve lifter interposed between the engine cam and spring loaded valve, and the reference lines X and Y indicate, respectively, the valve lifter in its expanded and contracted positions to compensate for contracted and expanded valve stem conditions;

Figures 27 and 28 illustrate sections on the lines 27 and 28 of Figure 25 with the lifter removed from its guide in the crank case of the engine.

*The first form of construction in Figures 1 through 8*

In illustrating the several forms of my self-adjusting hydraulic valve lifters, I have shown a fragmentary portion of an internal combustion motor in connection with the first form of construction and from which the other forms of these inventions will be readily understood.

Referring now to Figures 1 thru 8, there is illustrated a conventional engine cylinder 2 in which a piston 3 reciprocates and a valve seat 4 defines a port opening, either intake or exhaust, leading to the cylinder. A poppet type valve of the usual kind includes a valve head 5 adapted to open and close in relation to its seat 4 and an integral valve stem 6 reciprocates in its guide 7 carried on the engine. The engine valve 6 is spring loaded to keep it closed on its seat 4 by a spring 8. A cam includes a heel or drop 9 and a lobe or lift 10 usually integral on the engine cam shaft as will be understood. Engine constructions also include a tappet or valve lifter guide 11 in which a valve lifter is mounted between the cam 9 and tail end of the valve stem 6. The foregoing is exemplary of standard engine practice.

I flare or cup the upper cylindrical end of the guide 11 to catch oil from the splash lubrication system or other oiling means of an engine and by which to feed oil down into the valve lifter. In the present instance my invention includes a lifter or tappet sleeve 12 having a lower closed end forming a cam follower 13. In operation, my valve lifter 12 transmits the throw or thrust of the cam lobe 10 to the spring loaded valve 6 to lift the same against the expanding closing force of the engine valve spring 8. In conventional practice, there is always left a few thousandths of an inch clearance between the old form of tappet in the guide 11 and the end of the valve stem 6 to allow for expansion and contraction due to temperature variations, but in my invention this space is constantly closed throughout all ranges of length change in the valve stem and other mechanism.

My invention, among other things, comprises a combination hydraulic and mechanical self-adjusting means carried in the tappet sleeve 12 for transmitting the thrust and carrying the load generated by the valve closing spring 8 and valve opening cam lobe 10. The valve lifter sleeve 12 has external oil grooves 14 extending longitudinally from the upper open end of the sleeve and communicating with a circumferential groove containing holes 15 thru the sleeve wall. This construction provides a system of passages which convey oil from the upper flared portion of the tappet guide 11 of the engine to the inside of the tappet sleeve to feed the compensating mechanism therein. There is shown a novel wedge retainer seat and guide means (see Figure 5) made from a cylindrical plug-like member and including a base 16 grooved longitudinally at 17 and transversely at 18 to form a system of oil leads to the underneath portion of this wedge seat device 16. This wedge seat 16 has an outside diameter adapting it to a sliding fit into and a stationary position at the bottom of the sleeve 12 and hence on the cam follower 13. The oil grooves 17 and 18 convey oil from the sleeve passages 14 and 15 downwardly along the inner surface of the tappet sleeve 12 to the very bottom or underneath portion of the wedge seat 16.

The plug-like wedge seat 16 is further characterized by a rectangular opening or chambering slot 21 cut from its upper end and extending downwardly and forming a flat bottom slide surface 22 formed at an angle to the engine-valve stem 6, say at right angles thereto. A compensating or self-adjusting pair of plunger-like wedges are slidably mounted upon the flat seat 22, and also within the slotted opening 21 there is formed a hydraulic compensating chamber of variable capacity as will be described. A valve controlled inlet and valve seat 23 is made centrally through the flat bottom wedge seat 22 and connects with the transverse oil grooves 18 to receive oil from the sleeve grooves 14 and flared guide 11. The inlet 23 includes a valve seat on which a freely movable ball check or other form of valve 24 rests to admit an up flow of oil and closes against a reverse flow, thus trapping oil above the flat seat 22. It is significant that this compensating valve 24 seats or closes the oil inlet port 23 by gravity, or by upward movement of the lifter sleeve, or by hydraulic pressure in the compensating chamber which it controls, or by combination of all these factors. Purposely, no spring means is employed to close this compensating ball valve means 24 and hence its action is sensitive and quickly responsive to un unseating tendency to allow oil to pass the seat 23 and flow upwardly into the slot 21 and a hydraulic chamber formed therein, as will be explained. The wedge seat member 16 rests within the sleeve, is stationary therein, and reciprocates therewith.

A self-adjusting plunger means in the form of a wedge pair, comprising two symmetrically formed wedges 27 and 28, in the nature of rectangular faced plungers, having flat bottoms 29, are spaced apart with a compensating spring 30 mounted therebetween with the spring ends seated in a socket 31 made in the adjacent faces of said wedges. The wedge pair 27, 28 has its lower flat faces slidably seated on the surface plane 22 with one wedge placed to either side of the oil inlet 23 and the expansion of the compensating spring 30 tends to thrust the wedges apart in the performance of their compensating function in one direction to automatically adjust outwardly for a contracting valve stem 6, as at the reference line X, yet this spring 30 yields to afford the reverse compensating function to adjust inwardly for an elongating valve stem 6, as at the reference line Y. The wedges 27 and 28 have a substantial range of transverse movement at right angles to the axis of the member 16 and its carrier sleeve 12. The limit of their outward movement is defined by the wedges abutting against the inner wall of the sleeve 12 and the limit of their inward movement is substantially a dead center position, as in Figure 8, where the wedges have practically closed together and compressed the self-adjusting spring means 30. Thus a double positive stop is provided for the self-adjusting plunger means 27, 28.

A one-piece double-faced wedge member or pilot wedge 33 is carried on the lower end of a thrust post or stem 34 having an upper guide head 35 slidably confined in the upper end of the sleeve 12 to close the latter. This single wedge 33 is made with angular or forked wing portions operatively disposed in the upper end of the slot 21 of the wedge seat 16 and embracing or coacting with the lower wedge pair 27, 28. The three wedge elements have symmetrically coacting angular or wedge faces 36 which cooperate to form an automatic self-adjusting unit within the slotted chamber 21 of the wedge seat 16. The single spreading double-faced wedge 33 includes the two converging wedge faces 36, meeting or converging centrally at an apex coincident with the axis of the stem 34 and lifter sleeve 12. The compensating spring 30 tends to drive the two self-adjusting wedges 27 and 28 outwardly, thus sliding the coacting wedge faces 36 along the double faced wedge member 33, and thereby urging the latter upward and longitudinally or outwardly of the lifter sleeve 12. Down pressure of the forked wedge 33, caused by the heavy valve spring 8, sets up a resultant closing force against the wedge pair 27 and 28 tending to actuate them centrally and toward each other to slide them to the apex of the double wedge 33, but the oil entrapped therebetween positively locks them apart.

The guide head 35 and single wedge forked member 33 preferably have an outer cylindrical size which closely fit these parts for easy sliding movement in the internal cylinder of the tappet sleeve 12. In other words, the outer vertical faces of the two wings forming the two-faced wedge 33, are cylindrical in form, similar to the head 30, and have a guided fit in the sleeve 12 the same as the head 35. The wedge member 33 has a vertical oil groove 37 made in each outer vertical cylindrical face to lead oil down to the bottom of the wedge seat 16.

The adjacent parallel or vertical faces of the two spaced self-adjusting wedges 27 and 28, together with the upper converging wedged faces 36 of the member 33, as well as the lower flat face 22, taken all together define or set off a closed hydraulic compensating chamber 40 of small volume with maximum displacement and of generally rectangular shape, as shown in the assembly views and which varies in size and volume to compensate for contraction and expansion of valve stem 6 and other parts of the valve operating mechanism. The flat vertical faces of all three cooperating wedges 27, 28 and 33 have a close sliding plunger-like or piston fit within the parallel walls forming the slotted opening 21 in the wedge seat 16. The compensating wedge set, comprising the three self-adjusting members 27, 28 and 33, constitute in effect a three-part plunger means which has a close bearing fit within the slotted member 16. The one-piece double faced wedge 33 is adapted to an up and down sliding movement in the chambering slot 21, while the two symmetrical wedges 27 and 28 are adapted to undergo a transverse sliding movement at right angles to the axis of the sleeve 12 and stem 34 throughout the operative sliding action of all three wedge means, they maintain a close oil tight fit against the walls of the member 16, and function in effect like a piston in a cylinder except here are employed flat sliding surfaces instead of cylindrical surfaces.

The component parts of the self-adjusting hydraulic valve lifter, as shown in Figure 6, are mounted in the sleeve 12 as shown in the assembly views, and the outer cylindrical surfaces of the wedge 33 have a free sliding fit in the inside cylindrical surface of the sleeve 12 and likewise for the outer small cylindrical face on each compensating wedge 27 and 28. When assembled the compensating spring 30 keeps the wedges 27 and 28 spread apart under the single wedge 33 and thus bears the stem 34 and head 35 upwardly against the lower end of the valve stem 6 to maintain a zero-clearance relation therewith. The parts are made so that when placed in operative relation, the wedges 27 and 28 assume a mid-adjustment position and have a long range of travel in both directions to accommodate maximum contraction and expansion in the mechanism.

The distance which the two wedges 27 and 28 stand apart determines the low or small volumetric capacity of the valve controlled hydraulic compensating and lifting chamber 40 and, as the wedges move farther apart, they enlarge this chamber and thus produce a suction therein with the result that the ball valve 24 is sensitively lifted off its seat and fresh oil flows up into the chamber 40, whereupon the ball 24 again seats and entraps the oil in the chamber 40, thereby locking or positively holding said wedges apart to fulfill their function of raising and lowering the spring loaded valve 5 in relation to its seat 4 against the powerful closing force of the engine valve spring 8.

The coacting wedge angles or inclined planes at 36 are comparatively flat. The steeper the angle, the more pressure there would be exerted on the hydraulic chamber 40 by the sliding reaction of the wedges. Conversely the flatter the angle the less pressure. Consequently, I choose an angle approximately as shown in order to exert a minimum of pressure on the oil chamber 40 and yet an angle sufficiently steep to permit a retracting or approaching movement of the wedges 27 or 28 under the force of the heavy valve closing spring 8, which occurs when the valve stem 6 expands due to a rise in temperature conditions. An angle in the neighborhood of twenty to twenty-five degrees, as measured from the horizontal or a line drawn at right angles to the line of thrust or axis of the valve stem 6, is shown and gives satisfactory results. This angle may be varied somewhat and can be increased or made steeper since the oil in the hydraulic chamber 40 will positively hold the wedges apart to lift the valve 5 and compress its spring 8.

The inclined thrusting and self-adjusting surfaces 36 in the compensator unit are found to give very satisfactory operating results with approximately the angular measurement herein disclosed. As an example of the comparatively low pressure exerted on the oil in the hydraulic chamber 40, let us assume that it requires a thrust of 125 pounds to actuate the engine valve 5 in relation to its seat 4. The angular wedge means here disclosed will only transmit about 3 per cent of the load pressure to the oil in the hydraulic chamber. Hence conventional valve springs of 125 pounds compressional resistance would only subject the oil to a pressure of 3.75 pounds, but inasmuch as the spring 30 will easily carry part of this load, say 2 or 3 pounds pressure, it is easily seen that only 1.75 or .75 pounds pressure is ultimately applied against the oil in the hydraulic chamber. In other words, the oil has to stand only 1 or 2 pounds pressure to hold the wedges 27 and 28 apart while they compress the 125 pound engine valve spring 8.

In the first form of the invention the supply of oil for the hydraulic chamber 40 flows down thru the sleeve grooves 14 and enters the inside of the tappet sleeve 12 thru the circumferential groove and passage means 15, and thence the oil feeds down thru the grooves 37, 17, 18 and then up thru the valve controlled inlet 23 leading to the hydraulic chamber 40. To insure a free flow of oil along these passages, it is preferable to provide vent holes 41 in the lifter head 35 and its stem 34 so as to equalize the air pressure in the sleeve under the head 35 to avoid all possibility of an air lock in order that the oil may run freely down thru the passages and stand available at the ball check valve 24 to be admitted to the chamber 40 upon the slightest outward movement of the wedges 27 and 28 under the expansive force of the spring 30. In other words, the open spaces in the sleeve are under normal atmospheric pressure to promote the free flow of oil to underneath the wedge seat 16.

In operation, the rotating cam lobe 10 approaches the cam follower 13 and thrusts the sleeve 12 upwardly and carries with it the stem 34 and lifts the valve stem 6 against the stiff compression or closing spring 8 thru the agency of the combined hydraulic oil chamber 40 and wedges 27 and 28. The small measure of oil in the chamber 40, due to the preferably restricted size of the latter, merely serves to keep the plunger wedges apart and substantially all of the thrust delivered from the cam lobe 10 is transmitted thru the coacting wedge faces 36 of the compensator unit, whereas, only a small percentage of the load is exerted in the form of pressure against the oil in the compensating chamber 40. Hence there exists little or no tendency to emulsify the oil because it is not pounded and compressed by the continuously running cam lobe 10. The upward thrust to open the engine valve 5 as well as the downward pressure to close it, is substantially and largely carried on, at or thru the engaged wedge faces 36 made at an angle between fifteen or twenty and say thirty degrees. By eliminating the continuous pounding and minimizing the pressure on the small body of oil in the hydraulic lifting chamber 40, it follows that the oil is not air soaked and emulsified into a thin jelly-like substance to lose its capacity as an in-compressible agent to positively hold the wedges 27 and 28 apart, and consequently the wedges perform their function perfectly and do not slip on their seat 22 during normal operation when no compensation is required due to constant engine temperature conditions.

An important structural feature which contributes to the successful operation of several forms of my invention resides in the fact that the self-adjusting wedge pair 27, 28 has a long range of travel and is multiplied in fact many times over the shorter travel of the single wedge 33. I attain this characteristic by the ratio wedge means. It is apparent that the angle 36 compels an outward sliding or separating movement of many thousandths of an inch for the two compensating members 27 and 28 in order to lift or force the wedge 33 and its thrust stem 34 outwardly one thousandth of an inch. No matter, therefore, how infinitely slight the variation or contraction existing in the valve stem 6, the response is instant in the compensating unit because fractional thousandths of an inch variation are transmitted to the hydraulic chamber in larger measures, many times over, and the ball valve unseats and there occurs a substantial intake of oil, increments which could not be added to the oil already in the chamber except for my amplification of the self-adjusting action greatly in excess of the slight change in length of operating parts. This feature also makes for quick priming and positive filling of the hydraulic chamber when the mechanism is first installed.

It is also noteworthy that there exists a minimum of frictional pressure between the cam heel 9 and the cam follower 13 during the period the valve head 5 is on its seat 4. This mode of operation follows by reason of the fact that the self-adjusting or compensating spring 30 is comparatively light, but more particularly because its expansive force is absorbed or taken up and resisted somewhat by the coacting angular wedge faces 36. By the time the self-adjusting spring 30 expends its force thru the wedge faces, there is comparatively little reaction pressure from this spring transmitted to the cam heel 9. Hence the cam 9 is rested so to speak and relieved of undue wearing pressure during the time the heel traverses said cam with the result that heat and friction is reduced between the bearing face of the cam 9 and follower 13 with the result that oil more readily finds its way to these engaging surfaces so that the wear of these parts is minimized.

When the valve lifter is first assembled, it is dry, i. e., its small chamber 40 contains no oil. The first turn of the cam 10 causes the plungers 27 and 28 to reciprocate toward each other and close up with their adjacent vertical faces coming together. This action displaces or completely eliminates the hydraulic chamber and consequently displaces all air therefrom or a maximum portion thereof. By this maximum displacement function, all air is expelled from the compression chamber. Also the action of the plungers 27 and 28 coming together provides a stop or inward travel limit to prevent over-compensation in one direction, i. e., prevents contraction of the self-adjusting unit into its tappet body or sleeve 12. As the cam 10 continues to turn and its heel 9 engages the cam follower 13, the return or compensating spring 30 begins to expand and thereby separates the wedges 27 and 28, thus sucking oil past the ball check 24 into the air-free hydraulic chamber 40. The tappet has an outward limit of compensating travel for the plunger means 27, 28 by virtue of the outer end of each plunger coming into engagement with the inside wall of the sleeve 12, and thereby the self-adjusting unit is limited as to its over-compensation in the other direction, i. e., expansion outwardly of the sleeve 12. The small volume of oil now trapped in the compression chamber locks the plunger wedges apart in compensated position, whereby said plungers transmit the lift of the cam lobe at the next and all successive turns of the cam.

The small volumetric capacity of the compensating chamber 40 simply means that the smaller the amount of oil contained therein the smaller will be the amount of air occluded in the oil and the less will be the gas or bubbles liberated by the oil when it becomes heated and is working under pressure. It is appreciated therefore that the small volume chamber 40, coupled with the fact that this chamber is capable of complete or maximum displacement, constitutes important features of construction and operation in my invention. This principle, by which I have solved certain preblems which heretofore caused failure of long sustained operation of hydraulic valve lifters, is also shown or employed in the design, construction and operation of modified forms of my invention.

A description will now be made of the other forms of the invention, but in doing so the reader will take into account the above description of the first form inasmuch as many explanations already given apply in effect to the succeeding forms and for that reason certain established principles and modes of operation may hereinafter be only briefly recounted or even omitted where the same are common to the types of valve lifters hereinafter described.

*The second form of construction in Figures 9 thru 12*

In this species of the invention, the same self-adjusting or compensating means per se is employed as heretofore described, but a characteristically different means of fresh oil supply is afforded the small-volume maximum-displacement hydraulic chamber, by way of a larger and more certain supply, which is always maintained, no matter how long an engine stands idle to afford opportunities for all the oil to drain away from the parts. The same reference characters as heretofore used, are applied to the conventional engine parts, such as the spring loaded valve, its operating cam, and other standard parts.

A tappet sleeve 42 is very similar to the former lifter sleeve 12 and has a closed bottom 43 as a cam follower and an open upper end to receive a compensating unit to be described. This sleeve 42 is designed to positively retain a substantially large supply of fresh oil in its lower end and in this connection there are made a number of oil holes 44 thru the sleeve high above the bottom end 43 thereof and within a circumferential groove 45, thus providing a deep non-draining oil receptacle 48 in the sleeve. Longitudinal oil feed grooves 46 are cut externally in the sleeve from the top end downward and communicate with the groove 45 and holes 44. A single oil discharge passage 47 extends downwardly along the outer surface of the sleeve thru the bottom end 43 thereof. Thus the sleeve 42 is made with several oil receiving grooves 46 to feed oil into its receptacle 48, but is provided with a less number of grooves, say only one groove 47 opening into the receptacle 48 high above the bottom wall 43, to discharge the overflow or excess oil from the receptacle 48 to maintain a circulation in the sleeve by which to effect a complete change of oil from time to time. In this way, there is always provided a larger inflow of oil to the non-drain deep receptacle 48 than is afforded by the discharge passage 47 of less conveying capacity than the several feed passages 46. The reciprocating action of the sleeve 42 effects circulation of oil therethru to keep the supply fresh. Any suitable means may be used to feed oil into the oil inlet 44 placed high in the sleeve 42.

The lifter sleeve 42 is made with a slightly larger upper internal bore than the lower portion which forms an annular shoulder means 49 above the oil feed passages 44 and 45 and which acts as a rest or support for a wedge seat member 51, shown in Figure 9, and which closes the upper end of the non-drain oil receptacle 48. This wedge guide retainer seat 51 is similar in function to the first described wedge seat shown in Figure 5, but is structurally different in that a long oil inlet neck or tube 52 reaches from the plug portion 51 down to the bottom of the non-drain oil receptacle 48. The neck 52 has its upper end integrally formed or otherwise secured to the cylindrical base or seat 51 and communicates with a valve controlled or ball closed oil inlet 53 drilled thru its flat face. Thus oil is sucked up the tube 52 and into a hydraulic chamber formed above the wedge seat 51. The flat bottom wedge seat 51 has upstanding parallel side walls forming a rectangular opening or chambering slot 54 within its plug-like body and which has a close fit within the sleeve 43 and is seated upon the shoulder means 49 above the large underneath oil receptacle 48 and the neck 52 projects down into the oil receptacle 48. A freely movable ball check valve 55 rests on the seat 53 and normally closes this oil inlet to admit oil up thru the neck 52 but prevents a reverse flow thereof. The lower end of the tube 52 is always immersed in oil no matter how long an engine stands unused, because the oil supply reservoir 48 never drains. The member 51 comprises, in effect, a partition which divides the tappet body or sleeve into a large oil reservoir or receptacle adjacent a small compensating space into which is operatively mounted the self-adjusting unit.

A pair of automatic self-adjusting wedges 57 have flat bottoms which slidably rest on the flat upper surface at the bottom of the channel or chamber 54 in the wedge seat 51. A compensating spring 58 is disposed between the wedge pair 57 with the spring ends inserted in a socket formed in the adjacent face of each wedge and keeps the wedges urged apart. This spring 58 rests horizontally right above the ball valve 55 and serves to prevent it from falling out of place during assembly operations or during high speed reciprocation of the tappet in event oil has not yet become entrapped in the hydraulic chamber above the ball valve 55.

Next in the assembly, there is provided a single or pilot wedge 59 having wing means and a double wedge face symmetrically formed in respect to the two wedges 57 and embracing or forking over the latter. This double faced wedge 59 rests on top of the two wedges 57 within the slot 56 of the seat and wedge retainer plug 51. The outer surfaces of the winged wedge 59 have a cylindrical bearing and sliding fit inside the sleeve 42 and its parallel flat sides have a close oil tight sliding fit between the parallel flat walls defining the wedge slot or chamber 56. Thus is constituted a hydraulic small volume compensating chamber 60 (see Figure 11) formed by the underneath converging wedge surface of the member 59 which constitutes the top closure of the chamber 60, the ball valve 55 and wedge seat 51 forms the bottom closure, and finally the adjacent parallel shorter flat faces of the two self-adjusting wedges 57 form the other closure walls of this chamber 60. The spring 58 is transversely disposed in the chamber 60 over the ball valve 55 and out of engagement therewith to leave it free on its seat 53. The wedge 59 constitutes a valve thrust member to lift the engine valve 6 and a seat against which the tail end of said valve stem rests with no-clearance engagement therewith.

The foregoing self-adjusting parts or compensator per se, comprising the wedge seat 51 together with the double faced wedge 59 and intermediate parts, are mounted in the upper end of the sleeve 42 and anchored on its shoulder 49. The automatic tappet is now complete and ready to be inserted in the tappet guide 11 usually formed in the crank case of an engine. The self-adjusting parts in the sleeve automatically assume a zero or no-clearance engagement between the engine valve 6 and lifter wedge 59 for the reason that the compensating spring 58 thrusts outwardly on the two wedges 57, thereby moving wedge 59 upwardly until it seats positively against the lower end of valve stem 6. The weight of the sleeve and expansive force of the spring 58 act downwardly on the sleeve 42 to maintain its cam follower 43 in no-clearance engagement with the cam. Hence the entire valve mechanism is set up without the slightest play, beginning with the running surface of the cam and extending all the way to the face of the valve seat 4 throughout all the mechanism.

In operation, oil is supplied in any suitable manner to the inlets 44 or collects around the upper cylindrical end of the engine tappet guide 11, from other parts of the engine such as the crank case, and flows downward along the grooves 46 and thru the holes 44 to fill the oil receptacle 48. When this receptacle is filled, the overflow oil discharges outwardly along the groove 47 and pours directly upon the cam 9, 10 to keep it lubricated. It is noteworthy that the lubrication of the cam from the receptacle 48 thru the oil drain groove 47 is very effective because the cam heel is under light pressure and thus readily retains oil to lubricate the lobe 10. The self-adjusting spring 58 is comparatively light and the wedge means resists its expansive force and the cam follower end 43 bears lightly on the heel 9. The oil supply never completely drains from the receptacle and, inasmuch as the supply neck 52 dips into the lower portion of receptacle 48, it is apparent that there is always available a supply of oil to feed upwardly thru the neck into the hydraulic chamber 60.

The rotation of the cam 9, 10 thrusts upwardly thru the lifter sleeve 42, through the shoulder 49, through the wedge assembly, into the valve stem 6 and thus lifts the engine valve 5 off its seat 4 by compressing the engine valve spring 8 which resiliently loads the valve 6 to keep it closed on its seat and maintains the sleeve 42 against the face of the cam as the lobe 10 passes beyond the cam follower 43. In event the compensating mechanism has been assembled in a dry state and there is no oil in the hydraulic lifting chamber 60, the downward pressure of the engine valve spring 8 will slide the self-adjusting wedges 57 inwardly, followed by the reverse motion thereof as soon as the cam heel 9 traverses the follower 43. Two or three of these pumping or plunging actions, as effected by the piston or plunger wedges 57 plunging back and forth in the space 54, quickly fills the hydraulic chamber 60 with oil by suction. The ball check valve 55 is sensitive to the upward inflow of oil drawn thereinto by suction of the plunger wedges 57 or forced in by atmospheric pressure. Instantly the chamber 60 is filled with oil, there remains no more lost motion between the cam follower 43 and its driving cam or between the valve stem 6 and its wedge 59, and the device is set for constant operation.

An angle sufficiently steep is chosen for the coacting wedges 57 and 59, as already explained in the first form of the invention, which effectively reacts thru the incline planes of the three wedges 57 and 59 to slide the piston wedges 57 together in event no oil is entrapped in the chamber 60 formed therebetween. Their next outward stroke primes or fills the chamber 60. This angle is not made too steep for that would place too great a pressure on the oil in the chamber 60. On the other hand, the angle is properly designed as not being too flat because it is desired that the wedge pair 57 have considerable relative motion along the flat bottom surface of the seat 51 in event no oil is in the hydraulic chamber 60 by which to pump oil up into that chamber. In other words, an angle somewhere between 15 or 18 to 25 or 35 degrees, measured from the horizontal, may be used but the angle shown of approximately 22 to 24 degrees, or thereabouts, gives very satisfactory operation, and affords the wedge pair 57 a proportionately greater self-adjusting movement than the shorter variation in length of the valve stem 6 and other parts due to changes in temperature.

In event the valve stem 6 gradually shortens, as in Figure 11 by cooling off, the compensating spring 58 gradually thrusts the wedges 51 apart, moving them several thousandths of an inch more than the valve stem 6 contracts, thereby drawing oil from the supply receptacle 48 upwardly thru the tube 52 into the chamber 60 to keep the wedges 57 hydraulically locked in their outermost self-adjusted position. As the lobe 10 thrusts upwardly on the sleeve 42, the pressure or force is comparatively light on the oil in the chamber 60 because most of the thrust is carried thru the wedge pair to the valve stem engaging wedge 59. The plunger wedges have outer stop means to limit their self-adjusting movement in that the outer end of said wedges come to rest against the inner cylindrical wall of the sleeve 42.

On the other hand, should the valve stem 6 elongate, as in Figure 12, then the powerful force of the valve closing spring 8, acting thru the inclined plane of the self-adjusting wedge means, i. e., the wedge 59 bearing heavily on the two slidable wedges 57, causes the latter to slidably approach each other since the closing force of the spring 8 is sufficient to enforce a creeping approach movement of the two wedges 57 by compressing the yieldable spring 58. The two plungers 57 have an inward travel limit or stop function when they meet at the apex of the pilot wedge 59. Of course, the closing or approach action of the adjusting wedges 57 is resisted by the oil in the chamber 60 but the increased pressure thereon becomes so great, due to the gradually increasing length of the valve stem 6, that the oil leaks out of the chamber 60 along the sides of the wedges or even past the ball valve. In fact it is not necessary to make the wedge set 57 and 59 with such a close and tight fit in the seat 51 and its channel 54 that no liquid can escape from the chamber 60 since the viscosity of the oil retards its escape. Furthermore, the engine valve opening and closing action by the cam 10 is so rapid that no appreciable amount of oil has time to escape from the chamber 60 during any one valve opening action, and for the further reason that little force or pressure is normally applied to the hydraulic chamber due to the greater portion of the load being carried on the wedges. Inasmuch as the valve stem elongation is slow and gradual, it follows that enough oil leaks out of the chamber 60 during the slow expansion of the valve stem 6 to accommodate its increased length. The valve loading spring 8 is of sufficient strength to always bring the engine valve head 5 to its seat 4 by keeping the volume of oil in the chamber 60 reduced to a point just where the valve 5 will seat, but no further reduction can be effected inasmuch as the self-adjusting spring 58 always keeps the plunger-like wedges outwardly disposed, limited only by engagement of the wedge 59 against the valve stem 6.

The spaced reference lines XY show the variation in length and range of change in both the valve stem and the automatic tappet, and graphically shows the proportionately greater travel of the compensating plungers as compared to the lesser change in length of the valve stem 6.

The restricted size or small volume of the hydraulic chamber 60 in comparison to the available supply of oil in the large non-drain receptacle 48, in combination with the complete closing movement of the compensating plungers 57 acting till they meet at the apex of the pilot wedge 59 causing displacement of the air from the chamber 60 on the first turn of the cam lobe 10, produces a hydraulic valve lifter of dependable and unfailing performance. Since the air is expelled from the chamber 60 before the latter is primed with oil, and only a small amount of oil is required, it follows that there can exist only the slightest amount of occluded air or gas bubbles in the oil sucked into the small air-free compression chamber to be subsequently liberated by pressure and heat. Consequently air troubles are eliminated and the incompressible characteristic of the oil is preserved. These features, small-volume and maximum-displacement compression chamber, are important principles in my invention.

*The third form of construction in Figures 13 thru 18*

This form of the invention is similar in principle but modified in structure over the species heretofore described and I have shown it in connection with an overhead rocker arm type of valve operating mechanism for valve in the head types of engines. As a matter of fact, however, my other valve lifters are also well adapted for use in conjunction with rocker arm types of valve mechanism.

There is shown a rocker arm 62 of standard form adapted to actuate a valve 63 loaded or closed by its spring 64. The latter parts are broken away inasmuch as they are not necessary for an understanding of this hydraulic form of valve lifter, and in fact the rocker arm 62 is merely shown for the purpose of bringing out the general purpose of an unusually long push rod 65 which is subject to considerable variation in length resulting from temperature changes due to its considerable length required to reach from the cam shaft in the engine up to the rocker arm on the cylinder head. A valve lifter or tappet guide 67 is carried by the engine in the usual way and in which the lifter or tappet sleeve reciprocates, and a cam shaft is provided with a cam having a lobe 68 and heel 69. The automatic self-adjusting valve lifter constituting the invention is maintained in no-clearance engagement with and between the push rod 65 and cam means 68, 69. The upper end of the guide 67 is flared or cupped to collect oil from the splash or other lubricating system of the engine to feed oil downwardly to supply the hydraulic self-adjuster unit.

A valve lifter sleeve 70 is constructed similar to those heretofore described and has its lower closed end 71 constituted as a cam follower while its other end is open for the reception of the self-adjusting parts. This sleeve 70 is made with a number of external oil grooves 72 leading downwardly to a passage in which are made a number of apertures 73 which pierce the wall of the sleeve. The grooved and apertured sleeve 70 is adapted to reciprocate in the tappet guide 67 and the passages feed oil to the inside lower end of the sleeve where the oil is available to flow into a hydraulic lifting chamber to compensate for contracting and expansion of the push rod 65 and other parts of the engine or mechanism.

Figure 5:
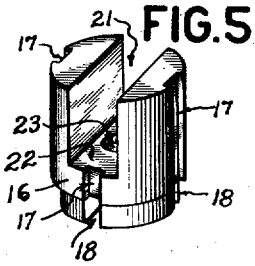
Figure 5 is a perspective view of a wedge seat or retaining and guide means therefor, as removed from the tappet sleeve, and within which the self-adjusting wedge means is carried to form a compensating hydraulic lifting chamber, and this member also carries the characteristic non-spring closed control valve which admits oil into hydraulic compensating chamber.

A wedge retainer or seat is provided for holding the self-adjusting members in place and comprises a cylindrically shaped plug-like member 74 similar to that already explained in Figures 5 and 9. It has a flat bottom seat 75 at the lower part of and within spaced parallel upstanding walls 76 defining a deep channel to movably carry a self-adjusting wedge set or pair as will be explained. This wedge guide 74 is also grooved vertically and horizontally on its cylindrical and bottom surfaces, as indicated at 77, by which to feed oil from the sleeve holes 73 down underneath thereof and up through an oil inlet and past a ball valve seat 78 and thence into a small volume hydraulic lifting compensating oil chamber 79 (see Figure 14) formed within its walls 76.

A freely movable ball check 81 seats on and closes the oil inlet 78 which is thus valve controlled to admit oil into the chamber 79 formed by a set of interfitting self-adjusting wedge means and also by the walls 76 of the wedge seat as will be described. The ball 81 is free in the opening 78 and closes by its own weight or by the pressure of oil thereon.

A pair of automatically compensating interfitting wedges 82 and 83 are operatively mounted in the channel 76. The wedge 82 is adapted as an underneath member and undergoes slidable adjusting movement along the flat face 75 across the valved inlet 78 and transversely of the push rod 65 and its line of thrust from the cam lobe 68. The upper wedge 83 undergoes a resultant adjustment travel in the sleeve 70 at right angles to the movement of the lower wedge 82 and hence axially in respect to the push rod 65 to maintain a no-clearance engagement with the latter. The two wedge means 82 and 83 have symmetrically engaging complementary faces 80 inclined to the axis of the push rod 65 and which slidably fit together with a liquid tight seal. They also have parallel vertical flat faces 84 defining two of the walls of the hydraulic chamber 79 heretofore mentioned. In fact, the two wedges have a pair of coacting angular plane faces 80, disposed in staggered relation, the aforementioned vertical faces 84 serving to step or stagger said wedge faces 80 in spaced planes on each plunger-like member.

Each wedge 82 and 83 is made with a spring receiving socket 85 adapted to receive an expanding compensating spring 86, the ends of which force outwardly to continuously urge or slide the wedge 82 laterally or along its seat 75 transversely to the upper wedge 83 and thereby impart longitudinal movement to the latter in the sleeve 70. The lower wedge 82 is made with an enlarged port opening 87 to pass oil from the valve controlled passage 78 up into the hydraulic chamber 79. The port 87 is sufficiently large to fully expose the ball valve 81 for all positions of the self-adjusting wedge 82 along its seat 75.

The wedge means with its valve and spring assembly just described is mounted within the retainer seat means 74, between the parallel walls 76 thereof, and the latter two walls close the hydraulic chamber 79 on its sides to complete its formation. The transversely movable member 82 slides back and forth on the stationary face 75 above the ball valve 81 and the latter is quite sensitive since it is not spring actuated or pressed. The longitudinally movable wedge 83 is made with a concave pocket 88 to receive the rounded lower end of the push rod 65 and the self-adjusting spring 86 acts to keep the upper wedge snugly against said push rod at all times.

The hydraulic valve lifter assembly, comprising the sleeve and its self-contained compensating means per se, is mounted in the tappet guide 67 with the cam follower end 71 resting against the cam and the lower end of the push rod 65 resting at 88 against the self-adjusting wedge assembly. As soon as oil is received into the chamber 79, the entire mechanism assumes a self-adjusted no-clearance working engagement between all parts, from the valve 63 all the way thru the mechanism back to the cam 69. The first few revolutions of the cam lobe 68 will serve to pump or suck oil from the supply passages 72 and 77 up past the ball 81 and into the chamber 79 to positively hold the wedge means 82 and 83 apart in their self attained and adjusted position.

In event the push rod 65 and other parts elongate, as in Figure 15 at the reference Y, it follows that the pressure of the engine valve spring 64 urges the wedge 83 downwardly in the sleeve 70, thereby applying a wedging and creeping force angularly on the lower wedge 82, the result of which is to work or adjust it to the left thereby lowering the upper wedge 83 to accommodate for said increased length of the push rod 65 and other parts, as caused by a rise in operating temperature of the engine. Under great pressure of the engine valve spring 64, the adjacent flat faces 84 of the wedge means are gradually brought together by forcing the oil to leak out past the plunger-like wedges and around the four walls defining the hydraulic lift and self-adjusting chamber 79. While the novel plunger means 82, 83 possesses an oil tight sliding fit within the channelled chamber 76, the oil will nevertheless slowly escape in the minute quantity required during the considerable period that the push rod mechanism is expanding the few thousandths of an inch.

On the other hand, let us assume that the push rod 65 and related operating parts contract or shorten up due to a drop in engine and valve temperature, as in Figure 14 at the pointer X. Under this condition, the slight play or clearance, which tends to show up between the cam 69 and its follower 71 or between the rocker arm 62 and valve 63 or at 88, results in quick responsive action from the compressed spring 86 to spread the parallel wedge faces 84 apart, by sliding the wedge 82 to the right and the other wedge 83 upwardly to fill the space and follow the receding push rod 65. This operation results in sucking oil up through the inlet 78 to fill the increased size chamber 79 and hydraulically locking the self-adjusted wedge 82 apart in spaced relation from the longitudinally movable wedge 83, and the latter wedge is unyieldingly held to its push rod seat 88.

Inasmuch as the engaged wedges 82 and 83 carry the greater portion of the load or thrust required to compress the spring 64 and actuate its valve 63, it follows that very little pressure is exerted on the oil chamber 79 between the wedge faces 84. This reduces the tendency of the oil to escape from the chamber 79 during normal operation in actuating the engine valve 63 against its spring 64 since the oil is called upon to do little work. Furthermore, this reduction in pressure avoids oil deterioration and emulsification. Also it is not necessary to so accurately and finely grind the plunger wedges and their retaining walls 75 and 76 inasmuch as there exists a minimum pressure tending to force the oil to escape.

The angular relation to the horizontal, as defined by the adjusting inclined planes 80 of the wedges provides an increased ratio of movement for the laterally adjustable wedge 82, as compared to the lesser change in length of the push rod 65 and other parts of the valve mechanism due to temperature variations and wear between the parts. This latter function of amplified self-adjustment facilitates the priming of the hydraulic chamber 79, and renders sensitive the ball valve 81 by causing it to quickly unseat and admit a large volume of oil as compared to the extremely small change in length of the push rod 65 and other parts. The compensating out stroke of the wedge 82, i. e., its oil suction intake stroke, may be designed to be many thousandths of an inch greater than the variation in length of the operating mechanism, and this design is attained by employing substantially the angle 80 shown on the wedge plunger members. Hence the intake of oil is more definite and certain, and larger increments of oil are drawn into the chamber 79, than would occur with an ordinary piston and cylinder type of hydraulic valve lifter.

The small volume compression chamber 79 means that this form of the tappet operates on a restricted amount of oil to hydraulically lock apart the self-adjusting plungers 82 and 83. Consequently little or no entrapped or occluded air is present in the oil drawn into said chamber which itself is free of air, at the instant of priming, inasmuch as the plungers have the maximum displacement function, due to the ability of the plungers to close up, on the first turn of the engine or cam, and thus force out all air preliminary to the priming action.

*The fourth form of construction in Figures 19 thru 23*

This form of the invention represents a simplified construction of the hydraulic valve lifter and employs a somewhat different form of self-adjusting wedge and hydraulic lifting chamber from that heretofore explained. There are provided two interfitting complementary wedge members having in effect screw-like jaw means, one of which is self-adjusting by reason of executing a characteristic combined rotary and longitudinal movement in the tappet sleeve to maintain the no-clearance engagement between all parts, and the other of which is stationary in the sleeve, and both have a close working fit to form a pair of radially disposed hydraulic compensating chambers. In this form, there is a single adjusting member which executes both motions necessary to adjust by the increased travel ratio principle of my invention.

A conventional valve head 89 operates in relation to its seat 90 and has a stem 91 adapted to reciprocate in a valve stem guide 92 under the closing force of an engine valve spring 93. The lower or tail end of the valve stem 91 is seated in no-clearance engagement with the hydraulic self-adjusting unit carried within a tappet or lifter sleeve 94 which reciprocates within a guide 95 ordinarily formed in the engine crank case where it can collect oil in its flared receiving neck from the splash in the crank case or other engine lubricating system. The sleeve 94 has a lower cam follower end 96 which bears with no-clearance engagement on a cam including a heel 97 and operating lobe 98. These parts are in effect exemplary of standard practice, and a description will now be given of the automatic hydraulic compensating means carried in the reciprocating lifter sleeve 94.

The cylindrical sleeve 94 constitutes a housing for the compensating mechanism and is made with a number of external longitudinal oil grooves 100 leading from the top open end downwardly to a circumferential groove 101 having holes 102 located above the bottom wall 96 to convey oil to the inside bottom end of the lifter sleeve 94 forming a non-drain oil receptacle 111 under the automatic self-adjusting means therein.

A lowermost stationary wedge member has a cylindrical head 104 with a supporting neck 105 made with an oil inlet and ball valve seat 106 and grooved out at 107 in its bottom for passing oil from the sleeve receptacle 111 up into the neck 105. The member 104 has its counterpart in a twin wedge head 113 having an upstanding seat or thrust stem 114 on which the engine valve 91 rests with zero clearance when the valve 89 is seated. The upper face of the head 104, as well as the lower or adjacent face of the cylindrical wedge 113, is formed with two oppositely disposed inclined wedge or spiral planes 108, each of which extends 180 degrees around the engaged or adjacent circular face of both heads 104 and 113. The two symmetrical wedge faces 108 are not unlike a screw having a half revolution thread means. Each end of both inclined planes 108 terminates in a vertical shoulder means 109 which is pierced or drilled at 110 to form a spring receiving socket. When fitted together the shoulders 109 operate like jaws with a closing and opening motion.

The plug-like member 104 rests in the lower end of the lifter sleeve 94 and has an oil tight fit between its cylindrical surface and the inside of said sleeve, and the member 113 likewise has an oil tight rotary and longitudinal motion fit in the sleeve and is adapted to undergo that motion by reason of its coaction with the lower member 104. The angle of the spiral plane or planes 108 is chosen as heretofore explained in connection with other forms of the invention. It is desired that the angle 108 be steep enough to initiate down rotary motion of the head 113 when pressure of the engine valve spring 93 is applied thereto. The neck 105 supports the wedge head 104 above the cam follower end 96 and thus is provided the aforementioned adequate size oil receptacle 111 underneath the head 104 to feed oil upwardly thru the neck 105 to the automatic compensating means.

A ball or other form of check valve 116 rests on the seat 106 in the neck 105 to admit oil thru the neck into a hydraulic chamber means 119 and prevents its escape therefrom. A pair of compensating springs 117 are mounted between the adjacent shoulders 109 with the ends of said springs inserted in the spring seats or sockets 110 and the expansive force of the springs impress a rotative force on the self-adjusting member 113. The assembly just described comprises the self-adjusting unit which is mounted in the sleeve 94. The two springs 117 are under compression and both expand to screw the head 113 relatively on the stationary head 104 thereby forcing it upwardly to maintain the thrusting stem 114 in no-clearance engagement with the engine valve stem 91.

The self-adjusting unit is so manufactured as to normally set the adjacent shoulders 109 in a mid-spaced relation with room for rotative self-adjustment of the part 113 in either direction so that it may screw up or down on the lower wedge 104 and in the sleeve 94. The two sets of spaced jaws 109 in part set off and form a restricted size hydraulic chamber means 119 which has its formation completed by the inside wall of the sleeve. The compensating springs 117 tend to screw the stem 114 upwardly to accommodate a contracting or shortening valve stem 91 but yield or compress under the greater force of the engine valve spring 93 to force the self-adjusting head 113 rotatively downward to compensate for elongation of the valve stem 91. It is significant that the inside cylindrical surface of the sleeve 94 closes in and completes the formation of the two hydraulic lift chambers 119 (see Figure 23) which connect radially with the valve controlled oil passage in the neck 105. The volume of the chamber or chambers 119 increases and draws in more oil as the thrust stem 114 screws out or upward and decreases and forces its oil out by seepage as the self-adjusting member 113 rotates in or downward. Oil within the chamber 119 locks or holds the jaws 109 apart in their spaced adjusted position.

In operation, should the compensating wedges 104 and 113 be assembled in a dry state without oil, the first few turns of the cam lobe 98 will cause oil to be pumped upwardly past the ball valve 116 into the two-part or radially formed hydraulic chamber means 119 by reason of the combined rotative and longitudinal screwing movement of the double faced wedge head 113 in the lifter sleeve 94. In other words, if the chamber 119 is dry, the engine valve spring 93 forces the head 113 to screw downwardly, while the lighter compensating springs 117 impart a reverse movement to the member 113, and thus a spiral pumping action occurs between the self-adjusting member 113 and its stationary mating part 104 during rotation of the cam. In this way, oil is sucked from the receptacle 111 in the bottom of the sleeve 94 up into the chambers 119 to positively hold the spaced shoulders 109 apart by reason of the non-compressible oil body in the chamber 119, and the self-adjusting unit is thus rigidly set up to perform its function of opening the engine valve against the resistance and load of the heavy spring 93.

Should the valve stem 91 and other mechanism shorten due to a drop in temperature, the twin springs 117 immediately expand and take up for the space occasioned thereby, while on the other hand, should this valve stem 91 elongate due to a rise in temperature, the greater force of the engine valve spring 93 gradually urges the wedge part 113 downwardly until a small portion of the oil is forced by leakage out from the radial chamber 119 to thus compensate for the increase in length of any parts in the valve mechanism. The pointers XY are shown spaced apart to a somewhat exaggerated degree to indicate the range of length variation in the valve operating mechanism and consequently show the range of expansion and contracting in the tappet.

The compression chamber 119 is of comparatively low volumetric capacity and hence it requires little oil to hydraulically lock apart the relatively rotatable shoulders 109. Furthermore, the pair of shoulders 109 are adapted to coact or close up as shown in Figure 21, on the first half turn of the cam 98, and thus by complete displacement or elimination of the chamber 119, expel the air therefrom. The small measure of oil which now enters this air-free chamber, on the second half turn of the cam, functions satisfactorily free of air or gas bubbles and the oil retains its incompressible character during sustained runs of the engine because such a small volume of oil in the compression chamber 119 contains little occluded air or gas and there is minimum liberation thereof.

*The fifth form of construction in Figures 24 thru 26*

This form of the invention embodies principles similar to those heretofore described but the self-adjusting unit in the lifter sleeve is characteristically different in structure, and the self-adjusting wedges do not form the hydraulic lifting chamber.

An engine valve 121 is closed by its spring 122 on its seat 123 in the usual way and is carried in a standard form of guide 124. The engine valve is actuated by a cam having a lobe 125 and heel 126, the combination hydro-mechanical lifter being interposed between the cam and valve stem and reciprocating in the usual form of tappet guide 127.

The component parts of this combination hydraulic and mechanical valve lifter are shown in Figure 24 and include a sleeve 129 as heretofore described and having external oil grooves 130 connecting with apertures 131 piercing the sleeve wall to lead oil from the upper end of the cylindrical guide 127 down into the sleeve 129 to supply oil to the self-adjusting unit housed within the sleeve.

A cylinder-like tube 133 is grooved in its bottom at 134 and rests on the inside bottom end of the sleeve 129 together with a flange 135 at the upper end of the cylinder 133 which holds it in place. This flange is pierced at 136 to admit air to the bottom of the sleeve 129 to equalize the air pressure therein so that oil will flow freely from the sleeve passages 131 down into the bottom of the sleeve. The cylinder 133 is stationary on the bottom of the sleeve and the flange 135 braces it vertically in place. An oil inlet is made thru the bottom of the cylinder 133 and has an upper ball valve seat 137 to convey oil from the sleeve 129 up into this small compensating cylinder.

A ball check valve 139 closes the seat 137 and is freely movable thereon. The ball closes the oil opening 137 by its own weight, or by the pressure of oil thereabove, or by virtue of the rapid up-movement of the sleeve 129. It is to be noted that this ball valve, like others heretofore explained, is not spring actuated and hence is sensitive to the slightest suction or intake tendency to draw oil upwardly thru the opening 137. A resilient compensating spring 140 is placed in the bottom end of the cylinder 133 and away from or concentrically with the ball valve 139 so that there is no interference in function between this spring and the ball.

A self-adjusting plunger or piston 142 has an upper flat portion or guide 143 which terminates in a wedge face 144. This piston is reciprocable in the cylinder 133 against the coiled compression spring 140 and the spring continuously urges the piston upward in the cylinder to press its wedge face 144 against a self-adjusting wedge now described and having a similar face designated by the same number.

A self-adjusting wedge 145 has a flat bottom 146 which slides laterally on the upper face of the flange 135. This adjusting wedge 145 has an inner wedge face 144 which is the counterpart and made at the same angle as the operating wedge face 144 on the piston 142. The flat guide portion 143 of the piston is slidably confined in a guide slot 147 cut inwardly from the longer cylindrical surface of this transversely slidable wedge 145. In fact the slot 147 defines the inner wedge face 144 for both wedge members 143 and 145. The two wedge faces 144 coact to perform a part of the self-adjusting function of this device. The upper face of the transversely movable self-adjusting wedge 145 terminates in an inclined plane or wedging surface 148 which also denotes and defines the angle on a valve thrusting plug member 150 mounted in the top end of the sleeve to close it.

The aforementioned valve thrusting member 150 has its lower face 148 as the counterpart of the upper face formed on the self-adjusting member 145. This cylindrical plug-like member 150 slidably fits into the upper end of the tappet sleeve 129 to enclose all the parts therein and to also act as a thrust seat for the engine valve 121 and is maintained in constant engagement therewith for all variations in length of the valve operating mechanism.

The self-adjusting three-element wedge means, together with the cylinder 133, as well as the spring 140 and ball 139, are assembled as the compensator or self-adjusting unit within the valve lifter sleeve 129 to complete its organization. The completed device is now mounted in the tappet guide 127 as shown and the expansive force of the spring means 140 immediately sets the multiple wedge means 143, 145 and 150 up in operative relation and snugly engages the thrust plug 150 against the tail end of the valve stem 121. In assembling the parts, oil may as well be poured in the sleeve 129 or into the cylinder 133 under its piston 142, but in any event the first few turns of the cam lobe 125 will act to suck oil past the ball valve 139 until the cylinder 133 is full and no more oil can be drawn thereinto, whereupon the piston 143 attains a self-adjusted stationary position ready to stand rigid and lift the spring loaded engine valve 121. If the cylinder 133 is dry when the parts are assembled the coacting wedge faces 144 and 148 set up a long stroke reciprocation of the piston 142 which instantly primes this automatic tappet by filling the chamber under the piston.

In operation, the oil under the piston 142 is noncompressible and serves to brace and hold the piston in stationary position as the cam lobe 125 lifts the sleeve 129 to actuate the valve 121 off its seat 123 against the powerful closing action of the engine valve spring 122. As in other forms of the invention already described, the coacting angular wedge faces 144 and 148 in the present instance act to transmit substantially all or at least the greater portion of the thrust from the lobe 125 upwardly to compress the spring 122 and open the valve, and the wedging means diminishes the load and pressure on the oil within the cylinder 133 under the piston 142. The body of oil under the self-adjusting piston 142 is called upon to perform little work and is not whipped and emulsified to lose its non-compressible characteristics as indeed would occur if all the cam and engine valve spring pressure load was applied to the oil.

In event the valve stem 121 contracts or shortens, as in Figure 25 at the reference line X, space tends to develop between the end of the valve stem 121 and the thrust plug 150, but so soon as that occurs the spring 140 urges the piston 142 upwardly, causing the flat wedging member 143 to creep upwardly in the slot 147 thereby urging the self-adjusting member 145 to the left along its flange seat 135. This operation causes the coacting wedge faces 148 to effect a straight upward movement of the plug 150 to fill in the space occasioned by the few thousandths of an inch contraction in the valve stem 121 which occurs when the engine temperature drops. Thus the compensating spring 140 and the multiple wedge means, comprising the three parts 142, 145 and 150, all coact to automatically self-adjust and maintain a positive state of zero clearance from the valve seat 123 itself right down to the running face of the cam 126.

On the other hand, let us now assume that the temperature of the engine is rising with the result that the valve stem 121 is gradually elongating or growing in length, as in Figure 26 at Y. The mode of self-adjustment is simply the reverse of that heretofore described, with the exception that oil must now find its way by leakage from under the piston 142. A little oil may escape past the ball 139 and possibly more oil will escape up past the piston 142 because the superior expansive force of the heavy engine valve spring 122 will under all circumstances keep the piston 142 sufficiently downward, with the oil driven from underneath thereof, to always permit the engine valve 121 to softly but positively close on its seat 123. The powerful engine valve spring 122, if the valve is not reaching its seat 123, enforces a right hand creeping movement of the self-adjusting wedge 145, and continues to do so as long as the valve stem 121 is expanding. The angular faces 144 and 148 are designed to set up a laterally right hand creeping motion, in the views being described, with a resultant downward creeping motion of the piston 142, in event the superior pressure of the spring 122 is applied to the plug 150 and this of course happens when the valve stem 121 increases infinitesimally the slighest amount. Elongation of the valve stem 121 occurs so slowly and gradually that the high speed rotation of the cam and lobe 125 aids by vibration the extremely small creeping movement of the plunger 142 downwardly and the self-adjusting wedge 145 to the right, but the non-compressible oil body under the piston rigidly holds the latter in non-yielding and thrusting position. In this way, the automatic self-adjusting unit yields, shortens up, or draws into its sleeve 129, in precisely the same and exact proportion and at the same rate as the valve stem 121 expands.

*General explanation principles of the invention*

Several types of multiple wedge instrumentalities and sensitive hydraulic chambers have now been described in a number of representative examples of my invention. It is clear therefore that I have combined, into an operative assembly, both mechanical and hydraulic means, and do not rely solely on either to transmit the throw and load of the cam to the engine valve to actuate it under the loading force of its spring. The design of the several examples presented herewith affords a thrust mechanism which carries the load mechanically, resort being had to the hydraulic oil body to simply maintain the self-adjusting elements in place. While the many advantages of this combination hydro-mechanical valve lifter have been explained in connection with each example shown, I will summarize the modes of operation and other points which are conclusively instructive.

For example, the parts, constituting my automatic tappets, are small in size and the tappet is light in weight. Light weight reciprocating parts are essential for high speed. Since little working pressure need be applied to any of the hydraulic chambers, the latter may be small with a consequent small body of oil therein which contributes to reduction in weight of the reciprocating mass.

The filling of the hydraulic chambers is positive and instantaneous due to the long suction stroke or travel of the load carrying self-adjusting plunger means. This characteristic long stroke compensation, for the corresponding short change in length of the train of mechanism to actuate the engine valve, is attained by the inclined planes or wedge faces shown by which to greatly increase the motion in the self-adjusting load carrying unit over the shorter distance traveled by the valve stem or push rod variation.

The valve lifter and its compensating unit possess unusual rigidity to non-yieldingly transmit the cam throw pressure for the reason that there exists no likelihood of the oil in the hydraulic chamber losing its non-compressible character. The small measure of oil used in the compression chamber is not whipped and pounded by the heavy engine valve spring from one direction and the high speed cam from the other direction. Consequently, no air bubbles are admixed in the oil to emulsify and soften it. Furthermore, and even so, such a condition would not adversely affect the rigidity and operation of the self-adjusting units because the extremely light pressure exerted on the oil body in the hydraulic chamber would be successfully resisted and held by a softened and deteriorated oil mass. The displacement of the air from the hydraulic chamber, at the instant of priming it, gives an air-free chamber to begin with, and it remains so.

Other advantages and characteristics will become apparent upon understanding the foregoing and the invention fills a need felt for improvements in this field.

What is claimed is:

1. Valve operating mechanism, comprising in combination, a spring loaded valve operable in relation to its seat, a cam having a lobe and heel, a lifter sleeve having a cam follower portion and interposed between the valve and cam, self adjusting wedge means including a pair of spaced wedges and an overlapping wedge coacting with said pair, a retainer guide mounted in the sleeve and in which the self adjusting wedge means are operatively seated, an oil chamber enclosed between the wedge means and retainer guide, a compensating spring interposed between the wedge pair and urging same apart, an oil supply in the sleeve and valve controlled inlet leading to the oil chamber to admit the trap oil between the wedge pair to hold them in outwardly adjusted position, whereby the overlapping coacting wedges sustain the pressure and carry most of the load imposed by the cam and spring loaded valve during the open period thereof.

2. Valve operating mechanism, comprising in combination, a spring loaded engine valve operable in relation to its seat, a cam having a lobe and heel, a lifter sleeve having a cam follower end traversed by the cam, a wedge retainer seat and guide means mounted in the upper end of the sleeve, an oil supply receptacle formed by and within the lower end of said sleeve, a valve controlled inlet means opening from the wedge retainer seat and guide means down into the receptacle, self adjusting means in the wedge retainer seat and guide means disposed in no-clearance engagement with the engine valve and including a wedge pair slidable therein transversely of the sleeve axis, a compensating spring interposed between the wedge pair and adapted to move them adjustably outward from each other or yieldingly afford an approaching movement to maintain the aforesaid no-clearance engagement, a third wedge adjustable longitudinally in the wedge retainer seat and guide means and coacting with the wedge pair, a hydraulic compensating chamber formed between the wedge pair within the wedge retainer seat and guide means and enclosed by the bottom of said third wedge and into which opens the aforesaid valve controlled inlet means to fill the chamber with oil and hold the wedge pair apart, an oil intake and discharge provided in the sleeve above the cam follower end thereof to keep the receptacle full of oil and to discharge oil down on the cam and follower, whereby the rotation of the cam lobe opens the engine valve by thrusting through the wedge pair which takes the major portion of the load and hence the pressure on the oil in the compensating chamber is reduced to a minimum, and whereby the heel of the cam traverses the cam follower with minimum pressure while the spring loaded engine valve is on its seat by reason of the wedge pair being seated in the wedge retainer seat and guide means to thus take up the expansive force of the compensating spring and prevent the full force thereof from riding the follower on the cam heel to rest said cam while the engine valve is on its seat, and to enable oil from the receptacle aforesaid to reach the lightly engaging cam heel and follower surfaces.

3. A valve lifter for use in connection with valves and operating mechanism therefor comprising, a flat seat carried by the valve lifter and at an angle to the axis of the valve to be actuated, compensating devices including wedge means slidable on the seat, additional wedge means engaging the first wedge means and adjusted axially of the valve by the action of the first wedge means adjusting on its seat, and a hydraulic chamber cooperating with the compensating devices to fix the wedge means in their adjusted position.

4. A valve lifter for use in connection with valves and operating mechanism therefor comprising, a flat seat carried by the valve lifter and at an angle to the axis of the valve to be actuated, compensating devices including wedge means slidable on the seat, additional wedge means engaging the first wedge means and adjusted axially of the valve by the action of the first wedge means adjusting on its seat, and oil locked by a hydraulic chamber disposed between the first named wedge means and against which the pressure of the wedge means on the seat is sustained to fix the latter against displacement.

5. A self adjusting valve lifter comprising coacting wedge means having two pairs of complementary faces each pair defining an inclined plane at an angle to the axis of a valve to be actuated, a hydraulic chamber between the wedge means, and a valve controlled inlet and oil supply means communicating with the hydraulic chamber to feed oil thereinto between the wedge means as the latter adjustably moves in relation to each other.

6. A self adjusting valve lifter comprising coacting wedge means having two pairs of complementary faces each pair defining an inclined plane at an angle to the axis of a valve to be actuated, a hydraulic chamber between the wedge means, a valve controlled inlet and oil supply means communicating with the hydraulic chamber to feed oil thereinto between the wedge means as the latter adjustably moves in relation to each other; and spring means disposed within the hydraulic chamber, at an angle to the axis of said valve to be actuated, and each end of the spring means engaging under pressure against the wedge means.

7. A self adjusting valve lifter comprising coacting wedge means having two pairs of complementary faces each pair defining an inclined plane at an angle to the axis of a valve to be actuated, a hydraulic chamber between the wedge means, a compression spring disposed in the hydraulic chamber between the wedge means and expanding to exert a separating force applied to said wedge means at an angle to the axis of the valve to be actuated, an oil supply means for the hydraulic chamber including an inlet leading up toward the compression spring, and a freely movable valve mounted within the inlet under the spring and spaced therefrom to sensitively control the inflow of oil to the hydraulic chamber.

8. A self adjusting valve lifter comprising coacting wedge means having two pairs of complementary faces each pair defining an inclined plane at an angle to the axis of a valve to be actuated, a hydraulic chamber between the wedge means, a valve controlled inlet and oil supply means communicating with the hydraulic chamber to feed oil thereinto between the wedge means as the latter adjustably moves in relation to each other, said wedge means having substantially parallel adjacent or abutting faces as defining two of the closure walls of the hydraulic chamber aforesaid, said wedge means having spring receiving sockets formed in their parallel faces, and a coil expansion spring disposed transversely in the hydraulic chamber and having its ends mounted in the sockets aforesaid, said spring expanding to separate the parallel wedge faces to expand the valve lifter to compensate for contraction of the valve and compression within the sockets to allow the wedge faces to move toward each other and abut to compensate for elongation of the valve.

9. A combination hydro-mechanical valve lifter comprising, a channeled guide having a flat seat at an angle to the axis of a valve adapted to be actuated, self adjusting members slidably carried within the channeled guide and supported on the seat, said members and guide forming therewithin a hydraulic chamber, and the members being adapted to undergo an adjusting movement axially of the valve and angularly thereto which varies the volume of the hydraulic chamber.

10. A combination hydro-mechanical valve lifter comprising, a channeled guide having a flat seat at an angle to the axis of a valve adapted to be actuated, self adjusting members slidably carried within the channeled guide and supported on the seat, said members and guide forming therewithin a hydraulic chamber, and an expansion spring disposed between the self adjusting members and adapted to urge them apart slidably within the channeled guide.

11. A combination hydro-mechanical valve lifter comprising, a channeled guide having a flat seat at an angle to the axis of a valve adapted to be actuated, self adjusting members slidably carried within the channeled guide and supported on the seat, said members and guide forming therewithin a hydraulic chamber, said self adjusting members being provided with a socket means, a spring disposed under compression between the members with each end thereof in a socket aforesaid to urge the members slidably in the channeled guide, an oil supply inlet formed through the flat seat, and a ball valve freely positioned in the inlet under the seat and spring to admit and trap oil within the hydraulic chamber.

12. A compensating valve lifter combining hydraulic and mechanical means, comprising a self adjusting wedge pair, a flat bottom guide in which said wedge pair is operatively carried, said wedge pair and guide partly enclosing a hydraulic chamber, a valve controlled oil inlet leading to the chamber, spring means disposed in the chamber substantially parallel to the flat bottom of the guide and engaging the wedge pair to urge them apart, and a third wedge operatively mounted in the guide in engagement with the wedge pair and completing the enclosing of the hydraulic chamber.

13. A compensating valve lifter combining hydraulic and mechanical means, comprising a channeled guide having a flat seat, said flat seat being provided with a valve controlled oil inlet therethrough, a pair of symmetrically shaped wedges slidably carried on the flat seat to either side of the oil inlet, a spring mounted between the wedges to urge them apart and away from the inlet, and a third wedge slidably mounted in the guide and having a wedging face which is the counterpart of the first named wedges and engaging the latter.

14. A compensating valve lifter combining hydraulic means comprising, a sleeve having oil passages leading thereinto, self adjusting means including three wedges having flat sides and cylindrical surfaces, a retainer guide secured in the sleeve and having flat sides which engage the flat sides of the three wedges, the cylindrical surfaces of the self adjusting means having a sliding fit within the sleeve, the retainer guide and three wedges enclosing a hydraulic chamber, an oil supply inlet leading into the hydraulic chamber between two of the wedges, a freely movable ball valve closing the inlet by gravity, and a spring mounted above the inlet between and urging outwardly on the wedges.

15. A compensating valve lifter comprising a sleeve having passages to feed oil thereinto, guide means carried in the sleeve and having a flat seat; triple wedge means slidably mounted in the guide means, including a pair of symmetrically formed wedges with flat bottoms slidable on the flat seat and having upper inclined planes at an angle to the axis of the sleeve, and a single wedge member coacting with the inclined planes of the pair of wedges; spring means mounted between the pair of wedges, a hydraulic chamber formed between the pair of wedges and under the single wedge, and a valve controlled inlet leading up through the seat into the chamber.

16. A compensating valve lifter comprising, a sleeve having passages to feed oil thereinto, guide means carried in the sleeve and having a flat seat; triple wedge means slidably mounted in the guide means, including a pair of symmetrically formed wedges with flat bottoms slidable on the flat seat and having upper inclined planes converging at an angle downwardly from the axis of the sleeve and tapering toward the wall of said sleeve, and a single upper wedge forking over and engaging the pair of wedges and having a double wedge face which also converges from the sleeve axis toward the wall of the sleeve, expanding spring means between and engaging the pair of wedges to urge them outwardly toward the wall of the sleeve and thereby urging upwardly on the single wedge, and a valve controlled hydraulic chamber formed between the three wedges within the guide means.

17. An automatic valve lifter comprising, a sleeve provided with oil feed means leading thereinto, a channeled guide carried in the sleeve and having a flat seat with spaced upstanding walls, said guide being provided with an oil inlet leading up through the seat, a freely movable valve normally closing said oil inlet, multiple self adjusting wedge means slidably disposed in the guide and resting on the flat seat and forming a hydraulic chamber within said guide and into which opens the oil inlet, a compression spring mounted within the guide and coacting with the wedge means to adjust the latter, and a cylindrical closure head carried on the wedge means and slidably fitting in the sleeve and enclosing the latter and forming a seat on which an engine valve stem is adapted to rest with zero clearance.

18. An automatic valve lifter as defined in claim 17 but characterized by air vent means above the oil feed means in the sleeve, to equalize the air pressure in the sleeve to promote the free flow of oil thereinto.

19. An automatic valve lifter as defined in claim 17 but characterized by a stem carried on the wedge means and rising in the sleeve, said closure head being carried on the upper end of the stem and being perforated to communicate the inside of the sleeve with atmospheric pressure.

20. An automatic valve lifter comprising, a closed bottom forming a cam follower on a sleeve provided with an oil receptacle in its lower end, oil feed passage means communicating with the receptacle above its lower end, a discharge outlet leading from the sleeve at a point above its lower end and groove means leading the oil overflow downwardly to the cam follower, a hydraulic self adjusting unit carried in the sleeve, and said unit being provided with an oil feed means extending down into the oil receptacle.

21. An automatic valve lifter comprising, a sleeve having a closed bottom end constituting a cam follower, a longitudinal oil passage extending from the top to the bottom of the sleeve to convey oil into the sleeve and out again to the cam follower, said sleeve having oil holes formed therethrough at a point high above the cam follower to convey oil from the passage into the sleeve, thus providing a positively oil filled receptacle in the sleeve, and a hydraulic self adjusting mechanism carried at the upper end of the sleeve and receiving oil from the receptacle.

22. An automatic valve lifter comprising, a sleeve having a closed bottom end constituting a cam follower, said sleeve made with an external circumferential groove, a lengthwise passage leading down the outside of the sleeve from the top end to the circumferential groove, also another lengthwise passage extending from the circumferential groove down to the cam follower, oil holes in the circumferential groove to maintain the lower end of sleeve filled with oil and to discharge the overflow to the cam follower, shoulder means inside the sleeve above the oil holes, a seat device carried on the shoulder means, self adjusting members slidably carried on the seat device and forming a hydraulic chamber thereabove, spring means to actuate the members, and a valve controlled inlet formed through the seat device to convey oil into the chamber.

23. An automatic valve lifter comprising, a sleeve, a channeled guide having a flat seat and being secured in the upper end of the sleeve, an oil receptacle in the lower end of the sleeve, oil passage means connecting with the receptacle above its bottom to afford a circulation of oil through the receptacle and keep it filled, an oil feed neck carried by the channeled guide and reaching to the lower portion of the receptacle and extending up through the seat, a freely movable ball valve closing an inlet from the neck through the seat to admit oil up into the seat, self adjusting plunger wedges slidably carried by the flat seat and forming an oil chamber within the guide between the plunger wedges, and spring means to actuate the plunger wedges and suck oil into chamber.

24. An automatic valve lifter comprising, a sleeve, a compensating unit carried in the sleeve including cooperating wedges and providing an oil chamber between said wedges, an oil passage formed through one of the wedges leading into the chamber, and a valve controlled oil passage connected with said oil passage in one of the wedges.

25. An automatic valve lifter comprising, a sleeve, means to feed oil thereinto, a pair of cylindrical plug-like members mounted in the sleeve, said members having adjacent coacting spiral faces including shoulder means spaced apart to form a hydraulic chamber, spring means expanding between the members to urge the shoulder means apart and rotate a member and adjust it longitudinally in the sleeve, and a valve controlled inlet connecting with the chamber.

26. An automatic valve lifter comprising, a sleeve, means to feed oil thereinto, a pair of cylindrical plug-like members mounted in the sleeve, said members having adjacent coacting spiral faces including shoulder means spaced apart to form a hydraulic chamber, spring means expanding between the members to urge the shoulder means apart and rotate a member and adjust it longitudinally in the sleeve, an oil inlet neck integral with one of the members and supporting it above the bottom of the sleeve forming an oil receptacle thereunder, said neck communicating with the hydraulic chamber and including a valve inlet, and a freely movable ball mounted in the neck to close the valve inlet and trap oil thereabove when the spring actuates one of the members.

27. An automatic valve lifter comprising, a sleeve and passage means to feed oil thereto, a plug mounted in the sleeve with an oil receptacle therebelow and having a valve controlled inlet to lead oil from the receptacle to above the plug, a self adjusting plug having a sliding fit into the sleeve down onto the oil above the first named plug, said plugs having their adjacent faces made with coacting spiral faces terminating in shoulder means spaced apart to form a chamber to receive the oil, and spring means to apply torque to the self adjusting plug to rotate its spiral face on the other plug and suck oil into the chamber.

28. A hydraulic self adjusting valve lifter comprising, a sleeve having a deep non-drain oil receptacle the bottom wall of which forms the lower cam follower end of said sleeve, an inlet to supply oil to the non-drain receptacle, said inlet being located high above the cam follower end, a compensation means including a compression chamber located in the upper end of said sleeve above and adjacent the non-drain receptacle and above the inlet, and a long tube including a check valve leading from the compression chamber to the bottom of the non-drain oil receptacle.

29. A hydraulic self adjusting valve lifter comprising, a sleeve having its upper end open and its lower end closed to form a cam follower, a compensating means mounted in the upper end of said sleeve and including a compression chamber, a tube leading from the compression chamber down to the bottom of the sleeve adjacent the cam follower end thereof, a valve in the tube to pass oil to the compression chamber but check its return, and an oil feed inlet formed through the sleeve high above the cam follower end and adjacent the compensating means.

30. A hydraulic self adjusting valve tappet comprising, a sleeve adapted to reciprocate in a guide, the upper end of the sleeve made open, a closed bottom on the sleeve forming a cam follower, a compensating means mounted in the upper open end of the sleeve and including a hydraulic chamber having an inlet and a check valve closing same, a seat containing the inlet and check valve, said seat also forming the lower wall of the hydraulic chamber, a tube having its upper end attached to the seat and defining the inlet, the lower end of the tube extending down into the sleeve well below the seat, and an oil feed inlet made through the sleeve directly under the seat and high above the lower end of the tube to provide a non-drain oil receptacle always full of oil to supply the hydraulic chamber through the tube.

31. A hydraulic self adjusting valve lifter comprising, a sleeve having an open and closed end, a separately made plug member fitted in the upper open end of the sleeve and fixed therein below the top edge of said sleeve and leaving the upper end of said sleeve open, a compensating plunger means operatively disposed in the open end of the sleeve above the fitted-in plug member, said plunger means adapted to engage an engine valve, a tube depending from the plug member and reaching down into the sleeve, a valve seat formed in the upper surface of the plug member at the upper end of the tube and a ball check disposed on the valve seat, and an oil inlet formed through the wall of the sleeve high above the lower end of the tube to fill the sleeve and immerse the tube in a positive oil supply.

32. A hydraulic self adjusting valve lifter comprising, a sleeve having an open and closed end, said closed end forming a cam follower, an oil inlet formed through the wall of the sleeve above the cam follower to fill the lower portion of the sleeve with oil, a closure plug fitted into the open end of the sleeve below the upper end thereof but above the oil inlet, a compensating plunger means reciprocably mounted in the upper open end of the sleeve above the closure plug, a hydraulic compression chamber formed between the plunger means and the closure plug, a valve seat formed in the upper surface of the closure plug, a free ball check disposed within the compression chamber and held by gravity on its seat, a tube having its upper end attached to the closure plug and said upper end defining the valve seat aforesaid, and the lower end of said tube reaching down into the sleeve far below the oil inlet formed through the wall of the sleeve aforesaid.

33. A hydraulic compensating valve lifter comprising, a sleeve closed at one end, an annular shoulder formed in the sleeve above the closed lower end, the sleeve portion above the shoulder made larger in diameter than the lower sleeve portion, a closure member fitted into the upper end of the sleeve and resting on the annular shoulder forming a closed oil receptacle therebelow and a compensating space thereabove, a plunger means mounted in the compensating space above the closure member, a compressing chamber formed between the plunger means and the closure member, a tube depending from the closure member to the lower end of the sleeve, an oil inlet bored downwardly from the upper surface of the closure member to the tube and thereby opening said tube into the compression chamber, a ball resting freely over the oil inlet and constituting a check valve to admit oil from the tube into the compression chamber, and an oil supply opening formed through the sleeve adjacent the underneath surface of the closure member to feed oil to the receptacle and cover the tube.

34. A hydraulic compensating valve lifter comprising, a sleeve having an upper open end bored slightly larger in diameter than the lower closed end, an annular shoulder formed in the sleeve by virtue of the difference in sleeve bores aforesaid, a closure plug resting on the annular shoulder and forming an oil receptacle in the lower end of the sleeve, a self adjusting plunger means disposed in the sleeve about the closure plug, a compression chamber formed between the plunger means and closure plug, an oil inlet formed through the sleeve under and proximate the shoulder, a tube depending from the closure plug and having its lower open end terminating at the bottom of the oil receptacle, the upper end of the tube opening through the center of the closure plug into the compression chamber, a valve seat bored into the upper surface of the closure plug at the upper end of the tube, and a free ball check resting in the valve seat.

35. A compensating valve lifter comprising, a sleeve closed at one end and open at the other, an annular shoulder formed in the sleeve, a closure member fitted in the sleeve and resting on the annular shoulder, a hydraulic self adjusting means mounted in the open end of the sleeve above the closure member and coacting with the latter, an inlet valve formed in a seat bored down through the closure member from the upper surface of the latter and including a ball check resting in said bored seat below said closure member's upper surface, said inlet valve connecting the open end of the sleeve with the lower end thereof, and an oil supply opening through the sleeve high above the closed end thereof to feed oil into the sleeve and cover the inlet aforesaid which connects the two ends of the sleeve.

36. A valve lifter comprising, a sleeve divided into an oil receptacle formed in one end and a compensating space in the other end by a partition-like closure member secured in the sleeve between its ends, a valve seat formed deep into the closure member and defining an inlet which connects the two ends of the sleeve, a ball check resting on the seat by gravity and flush with the upper surface of the closure member, a hydraulic self adjusting means carried in the sleeve end above the closure member and coacting with the latter to admit of a close operating relation between said self adjusting means and the upper surface of said closure member; and spring means disposed in the self adjusting space, directly over the ball check to retain the latter in its valve seat, and coacting with the hydraulic self adjusting means.

37. A hydraulic self adjusting valve lifter comprising, a sleeve, a transverse partition dividing the sleeve into an oil receptacle and a compression chamber, an inlet leading from the oil receptacle into the compression chamber, a valve seat made in the partition, a ball check resting down in the seat below the surface of said partition, a member in the compression chamber parallel to the partition and overlying the valve seat to retain the ball check therein, and plunger means coacting with the compression chamber and adapted to engage an engine valve to actuate the latter, said plunger means having close operating engagement in relation to the partition and immediately over and in close relation to the ball check.

38. A compensating valve lifter comprising, a sleeve divided into an oil receptacle and hydraulic compression chamber, an oil inlet leading from the receptacle into the chamber and controlled by a check valve located within the limits of the compression chamber; and a self adjusting plunger means, coacting with the hydraulic chamber, and adapted to be actuated in one direction, before the chamber is filled with oil, to close up said chamber by operating displacement, thus expelling the air therefrom.

39. A compensating valve lifter adapted to be actuated by a cam and spring loaded engine valve, comprising a sleeve forming an oil receptacle, an oil feed opening through the sleeve into the receptacle above the bottom of said sleeve to maintain a high level of oil therein, a hydraulic compression chamber and a self adjusting plunger means coacting therewith carried within the sleeve, an oil inlet connecting the compression chamber with the oil receptacle, said oil inlet having its lowermost opening disposed proximate the lower end of the sleeve below the feed opening aforesaid and always covered in oil, a valve seat bored downwardly from the compression chamber along the oil inlet, a free-ball check resting within the valve seat and below the surface of the compression chamber, the plunger means aforesaid being located over the free-ball check and adapted to reciprocate within the sleeve and relatively thereto and coacting with the compression chamber to vary the volume of the latter in effecting automatic zero-clearance engagement with the engine valve, and said plunger means adapted to undergo an initial reciprocation in one direction to displace the compression chamber and close it up to expel the air therefrom prior to drawing a charge of oil past the free-ball check into the compression chamber as the latter is restored when the plunger means reciprocates in the other direction.

40. A compensating valve lifter adapted to be actuated by an engine cam, comprising a sleeve open at its upper end and bored on a large diameter downwardly part way therefrom to form an annular shoulder and made of reduced diameter from said shoulder to the bottom closed end of the sleeve, an inlet valve plug member fitted into the sleeve and resting on the shoulder and having an upper flat surface defining the bottom wall of a small volume hydraulic chamber in the upper large diameter end of said sleeve, the lower surface of said plug member defining the upper wall of a large oil receptacle in the reduced diameter of the sleeve under said small volume hydraulic chamber, a tube reaching from the bottom of the large oil receptacle up to and extending through the plug member into the small volume hydraulic chamber, a seat bored down into the plug member from its upper flat surface toward the upper end of the tube, a ball check resting in the seat over the tube and below the upper flat surface of said plug member, an oil inlet made through the sleeve high above the lower end of the tube to maintain a high level of oil in the large oil receptacle; and plunger and spring means coacting with the small volume hydraulic chamber, operative in close working relation with the upper flat surface of the plug member, and adapted to close and displace the small volume hydraulic chamber, expelling the air therefrom, upon the first half turn of the cam, preliminary to drawing oil thereinto for priming the chamber and automatically adjusting the plunger and spring means to zero-clearance with an engine valve.

41. A valve tappet of the class described comprising, a tappet body having an axial passage closed at its lower end and open at its upper end, a plug slidably mounted in the upper portion of said axial passage, check valve means located in said axial passage below said plug, said passage being return bent and extending upwardly within the tappet body, and liquid passage means arranged to direct the flow of liquid from a point outside of the tappet body through a considerable downward distance and communicating with said upper part of the return bent passage.

42. In a valve tappet of the hydraulic type, a tappet body having a longitudinal bore closed at its lower end, a separate cylinder disposed in the upper part of the bore, and a tubular portion of reduced diameter on the lower end of the cylinder and projecting into the lower part of the bore in the tappet body.

43. In a push rod, the combination with a guide member, of a valve tappet slidably confined within said guide, said valve tappet provided with a longitudinal bore, a plunger confined within the bore and leaving an unfilled space below said plunger, wedge means acting against the lower end of the plunger, and means for admitting liquid adjacent to the wedge means for the purpose described.

44. In combination, a guide, a tappet slidably mounted in said guide, a plunger slidably mounted in said tappet, said plunger having a beveled surface therein, a member having a beveled surface contacting against the first mentioned beveled surface, and means for exerting pressure against the said second member, said means preventing movement of the plunger when the plunger is under heavy strain.

45. A self-adjusting mechanical valve tappet comprising a guide, a tappet member slidable therein, said tappet member having a longitudinal opening and a laterally extending opening connected therewith, the plunger mounted in said longitudinal opening, the lower end of said plunger being formed at an angle, a wedge member having an inclined portion complementary to the lower surface of the plunger member, said wedge member being slidably received in the lateral opening, hydraulic means for exerting pressure against the larger end of the wedge member, and check valve means to prevent return of said pressure fluid.

46. Motion transmitting means for use between a poppet valve and an actuating cam therefor comprising, in combination, a movably mounted member having a blind opening therein the closed end of which opening serves as a liquid reservoir, cylinder means having an open end and a closed end projecting into said opening, piston means received in said cylinder means and cooperating therewith to form a pressure chamber in said cylinder means, one of said means having a passageway therein connecting said reservoir and said pressure chamber, valve means cooperating with said passageway operable to permit liquid to flow from said reservoir through said passageway to said pressure chamber and preventing flow in the opposite direction, and means constantly urging said piston means outwardly of said cylinder means, all of said means and valve forming a unitary assemblage applicable as such to said member.

47. Motion transmitting means for use between a poppet valve and an actuating cam therefor comprising, in combination, a movably mounted member having a blind opening therein forming a liquid reservoir, a cylinder member received in said opening, said cylinder member having that end thereof closest to the blind end of said opening closed, cooperating faces on said movably mounted member and cylinder member serving to position said cylinder member axially of said opening, piston means reciprocably received by said cylinder member and forming a pressure chamber between it and said cylinder member, means constantly urging said piston means outwardly of said cylinder means, the closed end of said cylinder member having a passageway therein communicating said pressure chamber in said cylinder member with said reservoir in said movably mounted member, and valve means cooperating with said passageway to permit the flow of liquid therethrough only from said reservoir to said pressure chamber.

48. Motion transmitting means for use between a poppet valve and an actuating cam therefor comprising, in combination, a movably mounted member having a blind opening therein forming a liquid reservoir, a cylinder member received in said opening and serving to baffle the direct escape of liquid in said reservoir from the open end of said opening, said cylinder member having that end thereof closest to the blind end of said opening closed, cooperating faces on said movably mounted member and cylinder member serving to position said cylinder member axially of said opening, piston means reciprocably received by said cylinder member and forming a pressure chamber between it and the closed end of said cylinder member, means constantly urging said piston means outwardly of said cylinder member, the closed end of said cylinder member having a passageway therein communicating said pressure chamber in said cylinder member with said reservoir in said movably mounted member, and valve means cooperating with said passageway to permit the flow of liquid therethrough only from said reservoir to said pressure chamber.

49. Motion transmitting means for use between a poppet valve and an actuating cam therefor comprising, in combination, a movably mounted member having a blind opening therein, means forming a partition in said opening between the opposite ends thereof, a piston reciprocable in said opening and forming a compression chamber between it and said partition, means constantly urging said piston outwardly of said opening, said partition having a passageway therein communicating the space at that end of said partition opposed to the blind end of said opening with said compression chamber, a valve cooperating with said passageway to control the flow of liquid therethrough to one direction only, and said member having a liquid inlet therethrough at a point axially of said opening between that end of said passageway nearest the blind end of said opening and the open end of said opening and in communication with the space between the blind end of said opening and the opposed end of said partition.

50. Motion transmitting means for use between a poppet valve and an actuating cam therefor comprising, in combination, a movably mounted member having a blind opening therein, means forming a partition in said opening between the opposite ends thereof, a piston reciprocable in said opening and forming a compression chamber between it and said partition, means constantly urging said piston outwardly of said opening, said partition having a passageway therein communicating the space at that end of said partition opposed to the blind end of said opening with said compression chamber, a valve cooperating with said passageway to control the flow of liquid therethrough to one direction only, and said member having a liquid inlet therethrough at a point axially of said opening between said valve and the open end of said opening and in communication with the space between the blind end of said opening and the opposed end of said partition.

51. Motion transmitting means for use between a poppet valve and an actuating cam therefor comprising, in combination, a movably mounted member having a blind opening therein, cylinder means having an open end and a closed end projecting into said opening and providing a liquid receiving space between it and the closed end of said opening, piston means received by said cylinder means and cooperating therewith to form a pressure chamber in said cylinder means, said cylinder means having a passageway therein connecting said pressure chamber with said space between said cylinder means and the blind end of said opening, valve means cooperating with said passageway to permit liquid to flow from said space through said passageway to said pressure chamber and preventing flow in the opposite direction, and means constantly urging said piston means outwardly of said cylinder means, said movably mounted member having a liquid supply passage through the side wall thereof at a point axially of said opening between said valve and the open end of said opening and communicating with said space.

ROBERT C. RUSSELL.